(12) United States Patent
Carmi et al.

(10) Patent No.: US 11,080,140 B1
(45) Date of Patent: *Aug. 3, 2021

(54) DATA RECONSTRUCTION IN DISTRIBUTED STORAGE SYSTEMS

(71) Applicant: Google Inc., Mountain View, CA (US)

(72) Inventors: Lidor Carmi, New York, NY (US); Christian Eric Schrock, Cold Spring Harbor, NY (US); Steven Robert Schirripa, Hazlet, NJ (US)

(73) Assignee: Google LLC, Mountain View, CA (US)

( * ) Notice: Subject to any disclaimer, the term of this patent is extended or adjusted under 35 U.S.C. 154(b) by 343 days.

This patent is subject to a terminal disclaimer.

(21) Appl. No.: 15/720,784

(22) Filed: Sep. 29, 2017

Related U.S. Application Data

(63) Continuation of application No. 14/188,773, filed on Feb. 25, 2014, now Pat. No. 9,804,925.

(51) Int. Cl.
 *G06F 11/14* (2006.01)
(52) U.S. Cl.
 CPC ................. *G06F 11/1423* (2013.01)
(58) Field of Classification Search
 CPC .................................................. G06F 11/1423
 See application file for complete search history.

(56) References Cited

U.S. PATENT DOCUMENTS

| | | | |
|---|---|---|---|
| 4,375,100 A | 2/1983 | Tsuji et al. | |
| 4,723,244 A | 2/1988 | Iacoponi | |
| 5,805,799 A | 9/1998 | Fredrickson et al. | |
| 5,948,118 A | 9/1999 | Higurashi et al. | |
| 6,048,090 A * | 4/2000 | Zook | G11B 20/1833 714/755 |
| 6,553,538 B2 | 4/2003 | Zehavi | |
| 6,810,499 B2 | 10/2004 | Sridharan et al. | |
| 7,134,066 B2 | 11/2006 | Hassner et al. | |
| 7,149,947 B1 | 12/2006 | MacLellan et al. | |
| 7,206,987 B2 * | 4/2007 | Roth | G06F 11/1072 714/755 |
| 7,418,620 B1 | 8/2008 | Tormasov et al. | |
| 7,447,839 B2 * | 11/2008 | Uppala | G06F 11/1052 711/114 |

(Continued)

*Primary Examiner* — Miranda Le
(74) *Attorney, Agent, or Firm* — Honigman LLP; Brett A. Krueger

(57) ABSTRACT

A method of operating a distributed storage system, the method includes identifying unhealthy chunks of a file. The file is divided into stripes that include data chunks and non-data chunks. The method also includes identifying healthy chunks available for reconstructing the unhealthy chunks and reconstructing unhealthy data chunks before reconstructing unhealthy non-data chunks using the available healthy chunks. When the unhealthy chunk is an unhealthy word-check chunk: reconstructing the unhealthy word-check chunk using healthy word-check chunks and healthy code-check-word-check chunks; determining whether reconstruction of the unhealthy word-check chunk is possible using only healthy word-check chunks and healthy code-check-word-check chunks; and when reconstruction of the unhealthy word-check chunk is not possible using only healthy word-check chunks and healthy code-check-word-check chunks, reconstructing the unhealthy word-check chunk using any healthy chunks.

16 Claims, 15 Drawing Sheets

(56) References Cited

U.S. PATENT DOCUMENTS

| | | | | |
|---|---|---|---|---|
| 7,577,866 | B1 | 8/2009 | Fan et al. | |
| 7,653,867 | B2 * | 1/2010 | Stankovic | H03M 7/30 714/785 |
| 7,831,896 | B2 | 11/2010 | Amram et al. | |
| 7,856,528 | B1 | 12/2010 | Frost et al. | |
| 7,904,782 | B2 * | 3/2011 | Huang | H03M 13/1191 714/752 |
| 7,917,827 | B2 * | 3/2011 | Chung | H03M 13/03 714/752 |
| 7,949,932 | B2 * | 5/2011 | Yang | H03M 13/6331 714/800 |
| 7,992,066 | B2 * | 8/2011 | Oh | H03M 13/6393 714/752 |
| 8,006,128 | B2 | 8/2011 | Olster | |
| 8,051,362 | B2 | 11/2011 | Li et al. | |
| 8,132,073 | B1 * | 3/2012 | Bowers | H03M 13/3761 713/160 |
| 8,171,374 | B2 * | 5/2012 | Miyazaki | H03M 13/1168 714/758 |
| 8,205,141 | B2 * | 6/2012 | Caggioni | H03M 13/05 714/752 |
| 8,347,173 | B2 * | 1/2013 | Kimura | H03M 13/1171 714/758 |
| 8,392,805 | B2 * | 3/2013 | Wylie | G06F 11/1076 714/766 |
| 8,433,685 | B2 | 4/2013 | Hayden et al. | |
| 8,433,979 | B2 * | 4/2013 | Blaum | G06F 11/108 714/770 |
| 8,533,231 | B2 | 9/2013 | Aizman et al. | |
| 8,555,142 | B2 * | 10/2013 | Grube | G06F 11/1076 714/764 |
| 8,595,586 | B2 | 11/2013 | Borthakur et al. | |
| 8,626,820 | B1 | 1/2014 | Levy | |
| 8,677,214 | B2 * | 3/2014 | Grube | H03M 13/616 714/763 |
| 8,694,599 | B2 | 4/2014 | Sentinelli et al. | |
| 8,719,677 | B2 * | 5/2014 | Alrod | G06F 11/1048 714/776 |
| 8,726,071 | B2 | 5/2014 | Gladwin et al. | |
| 8,782,498 | B2 | 7/2014 | Grossman et al. | |
| 8,832,523 | B2 * | 9/2014 | Lablans | G06F 11/1028 714/755 |
| 9,077,378 | B2 | 7/2015 | Wu | |
| 9,098,519 | B2 * | 8/2015 | Pavlov | G06F 11/1076 |
| 9,104,622 | B2 | 8/2015 | Anglin | |
| 9,229,810 | B2 | 1/2016 | He et al. | |
| 9,378,084 | B2 * | 6/2016 | Calder | G06F 11/10 |
| 2005/0022096 | A1 | 1/2005 | Kim et al. | |
| 2005/0160329 | A1 * | 7/2005 | Briggs | G06F 11/1028 714/54 |
| 2008/0222480 | A1 | 9/2008 | Huang et al. | |
| 2009/0019333 | A1 * | 1/2009 | McEvoy | H03M 13/1102 714/752 |
| 2010/0094817 | A1 | 4/2010 | Ben-Shaul et al. | |
| 2010/0218037 | A1 | 8/2010 | Swartz et al. | |
| 2010/0235677 | A1 | 9/2010 | Wylie et al. | |
| 2011/0113282 | A1 | 5/2011 | De Spiegeleer et al. | |
| 2011/0154100 | A1 | 6/2011 | Lee et al. | |
| 2011/0213919 | A1 | 9/2011 | Frost et al. | |
| 2012/0266044 | A1 * | 10/2012 | Hu | G06F 11/1092 714/763 |
| 2012/0311345 | A1 * | 12/2012 | Dhuse | G06F 12/1408 713/189 |
| 2013/0275844 | A1 | 10/2013 | Thornton et al. | |
| 2015/0012794 | A1 * | 1/2015 | Losh | G06F 11/1008 714/755 |
| 2017/0077950 | A1 * | 3/2017 | Pavlov | H03M 13/611 |

* cited by examiner

Nested Coding

Nested Coding

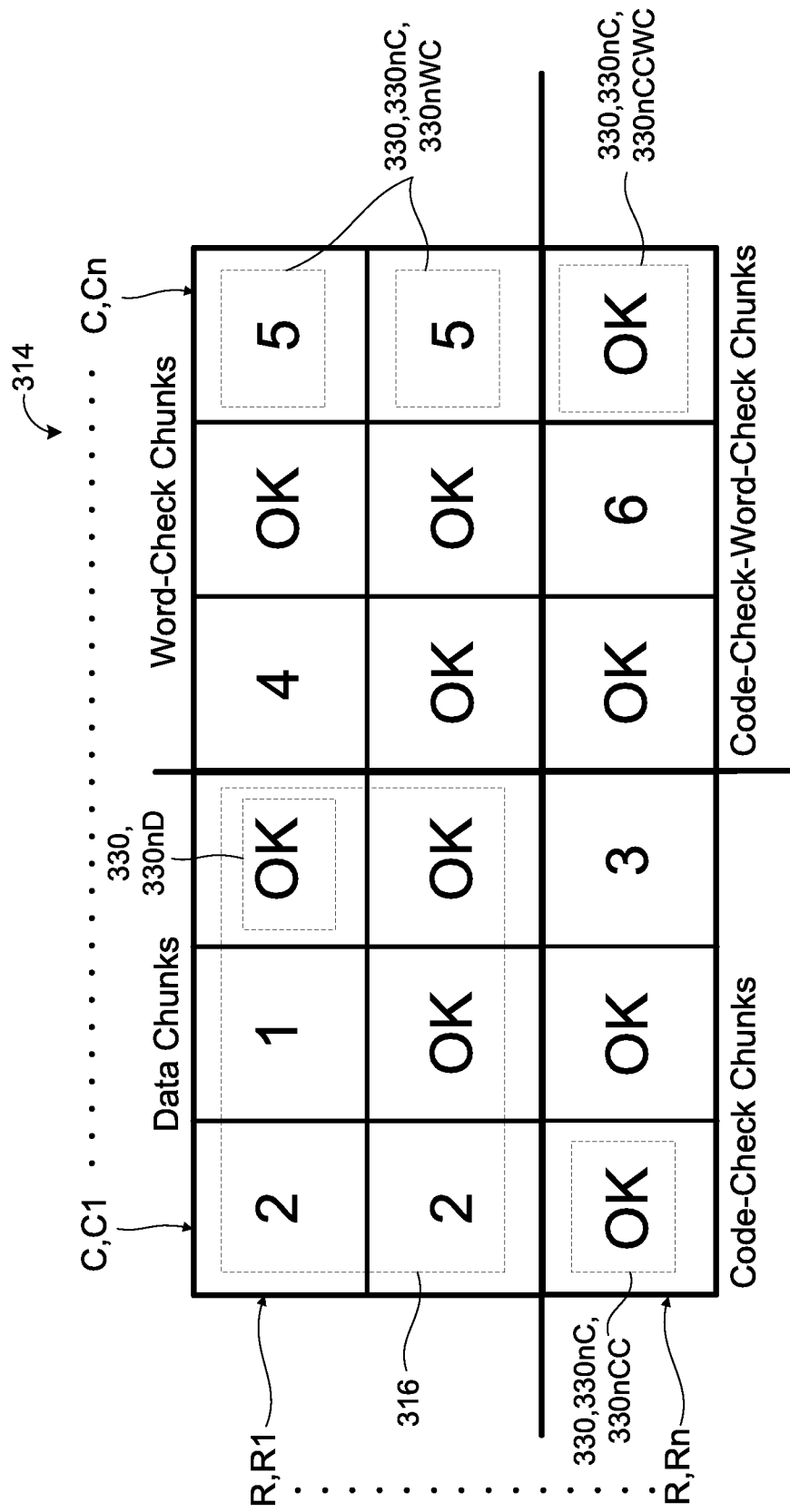

DATA RECONSTRUCTION IN DISTRIBUTED STORAGE SYSTEMS

CROSS REFERENCE TO RELATED APPLICATIONS

This U.S. patent application is a continuation of, and claims priority under 35 U.S.C. § 120 from, U.S. patent application Ser. No. 14/188,773, filed on Feb. 25, 2014, which is hereby incorporated by reference in its entirety.

TECHNICAL FIELD

This disclosure relates to data recovery in distributed storage systems.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes. Alternatively, Remote Direct Memory Access (RDMA) primitives may be used to transfer data from server hardware to client processes.

SUMMARY

One aspect of the disclosure provides a method of operating a distributed storage system. The method includes identifying missing chunks of a file. The file is divided into stripes including data chunks and non-data chunks. The method includes identifying non-missing chunks available for reconstructing the missing chunks and reconstructing missing data chunks before reconstructing missing non-data chunks using the available non-missing chunks.

Implementations of the disclosure may include one or more of the following features. In some implementations, the step of identifying non-missing chunks available for reconstructing the missing chunks includes excluding non-missing chunks located on storage devices non-operational for a threshold period of time.

The method may include determining a number of chunks to reconstruct per recovery cycle of the distributed storage system as a minimum of the number of missing chunks and a maximum number of chunks allowed for reconstruction per recovery cycle. The method may also include selecting missing data chunks preferentially over missing non-data chunks for reconstruction during each recovery cycle. The method may include randomly selecting missing data chunks for reconstruction from the identified missing chunks. Additionally or alternatively, the method may further include reconstructing missing chunks in an order that maximizes stripe durability.

In some implementations, the non-data chunks include code-check chunks, word-check chunks, and code-check-word-check chunks. In some examples, the method includes reconstructing the missing code-check chunks, after reconstructing the missing data chunks and before reconstructing the missing word-check chunks and the missing code-check-word-check chunks. In some examples, the method further includes reconstructing the code-check chunks, after reconstructing the missing data chunks and the missing word-check chunks and before reconstructing the missing code-check-word-check chunks, reconstructing the code-check chunks.

The method may include first reconstructing missing data chunks capable of being reconstructed from other data chunks and/or code-check chunks only. Then the method may include reconstructing missing data chunks capable of being reconstructed from any other non-missing chunks. For reconstructing missing data chunks capable of being reconstructed from other data chunks and/or code-check chunks only and for reconstructing missing data chunks capable of being reconstructed from any other non-missing chunks, the method may include reconstructing multiple data chunks on a server during a recovery cycle and moving the reconstructed data chunks, except one data chunk, to other servers. The method may further include identifying multiple chunks associated with the same code-check chunk for reconstruction during the recovery cycle.

In some implementations, the method includes reconstructing missing word-check chunks capable of being reconstructed from other word-check chunks and/or code-check-word-check chunks and then reconstructing missing word-check chunks capable of being reconstructed from any other non-missing chunks. The method may also include reconstructing missing code-check-word-check chunks after reconstructing all missing data chunks, code-check chunks, and word-check chunks. Reconstructing missing word-check chunks capable of being reconstructed from other word-check chunks and/or code-check-word-check chunks and reconstructing missing word-check chunks capable of being reconstructed from any other non-missing chunks may each further include reconstructing multiple word-check chunks on a server during a recovery cycle and moving the reconstructed word-check chunks, except one data chunk, to other servers.

Another aspect of the disclosure provides a system for operating a distributed storage system. The system includes storage devices for storing chunks of a file and a data processing device. The file is divided into stripes that include data chunks and non-data chunks. The data processing device communicates with the storage devices. The data processing device identifies missing chunks of the file and non-missing chunks available for reconstructing the missing chunks. Moreover, the data processing device reconstructs missing data chunks before reconstructing missing non-data chunks using the available non-missing chunks. In some examples, the data processing device identifies non-missing chunks available for reconstructing the missing chunks while excluding non-missing chunks located on storage devices non-operational for a threshold period of time.

In some examples, the data processing device determines a number of chunks to reconstruct per recovery cycle of the distributed storage system as a minimum of the number of missing chunks and a maximum number of chunks allowed for reconstruction per recovery cycle. The data processing device may select the missing data chunks preferentially over missing non-data chunks for reconstruction during each recovery cycle. In some examples, the data processing device randomly selects missing data chunks for reconstruction from the identified missing chunks. The data processing device may reconstruct missing chunks in an order that maximizes stripe durability.

In some implementations, the non-data chunks include code-check chunks, word-check chunks, and code-checkword-check chunks. In some examples, after the data processing device reconstructs the missing data chunks, and before the data processing device reconstructs the missing word-check chunks and the missing code-check-word-check chunks, the data processing device reconstructs the missing code-check chunks. Alternatively, after the data processing device reconstructs the missing data chunks and the missing word-check chunks and before the data processing device reconstructs the missing code-check-word-check chunks, the data processing device may reconstruct the code-check chunks.

In some examples, the data processing device first reconstructs missing data chunks capable of being reconstructed from other data chunks and/or code-check chunks only. Then the data processing device reconstructs missing data chunks capable of being reconstructed from any other non-missing chunks. The data processing device may reconstruct missing data chunks capable of being reconstructed from other data chunks and/or code-check chunks only and missing data chunks capable of being reconstructed from any other non-missing chunks by: reconstructing multiple data chunks on a server during a recovery cycle; and moving the reconstructed data chunks, except one data chunk, to other servers. The data processing device may identify multiple chunks associated with the same code-check chunk for reconstruction during the recovery cycle. Next, the data processing device may reconstruct missing word-check chunks capable of being reconstructed from other word-check chunks and/or code-check-word-check chunks; and then, the data processing device may reconstruct missing word-check chunks capable of being reconstructed from any other non-missing chunks.

In some implementations, the data processing device reconstructs missing code-check-word-check chunks after reconstructing all missing data chunks, code-check chunks, and word-check chunks. Additionally or alternatively, the data processing device reconstructs missing word-check chunks capable of being reconstructed from other word-check chunks and/or code-check-word-check chunks and missing word-check chunks capable of being reconstructed from any other non-missing chunks, each by: reconstructing multiple word-check chunks on a server during a recovery cycle; and moving the reconstructed word-check chunks, except one data chunk, to other servers.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3L is a schematic view of an exemplary order for reconstructing the stripe of FIG. 3D.

Like reference symbols in the various drawings indicate like elements.

DETAILED DESCRIPTION

Figure 1A:
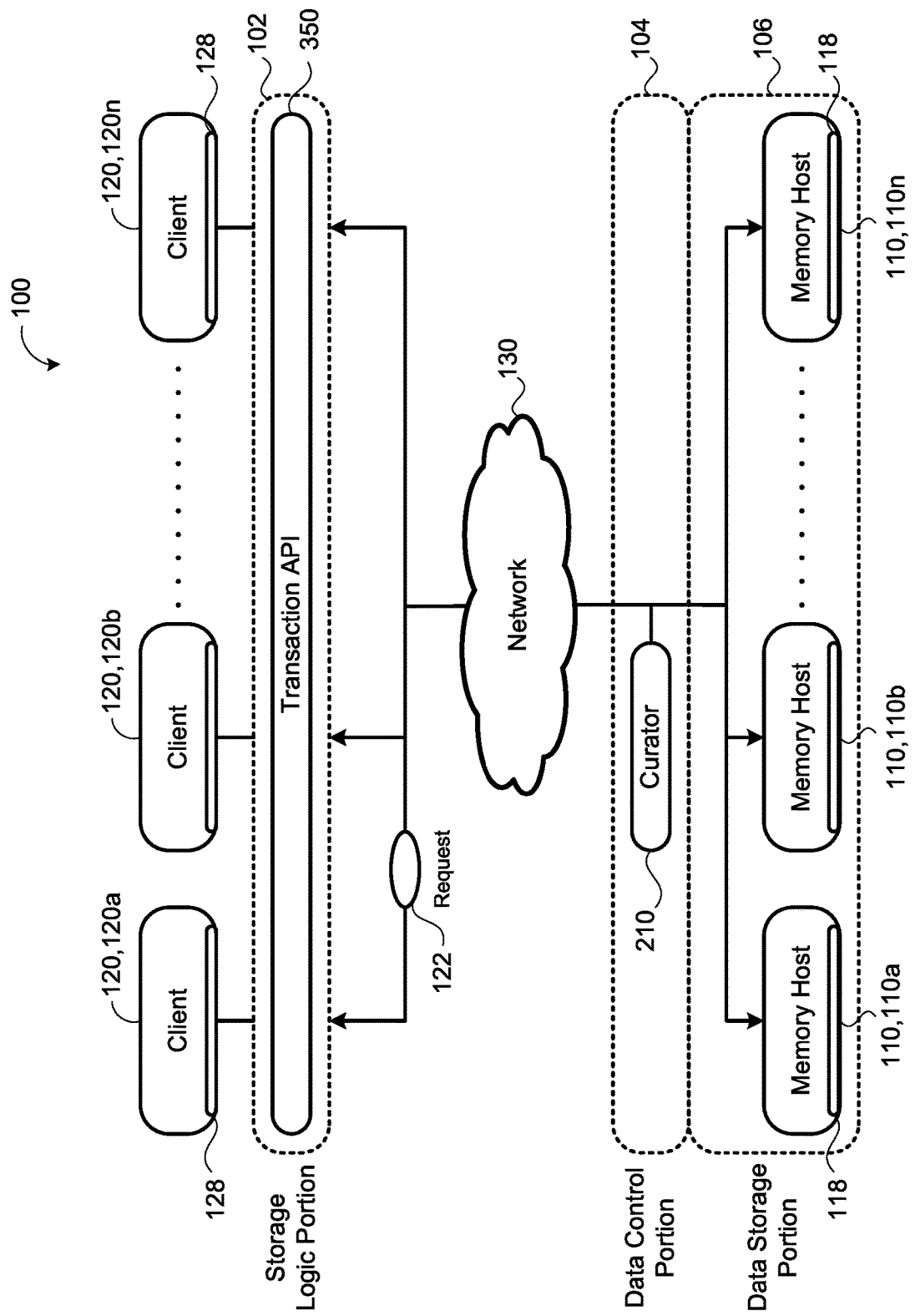
FIG. 1A is a schematic view of an exemplary distributed storage system.
Figure 1B:
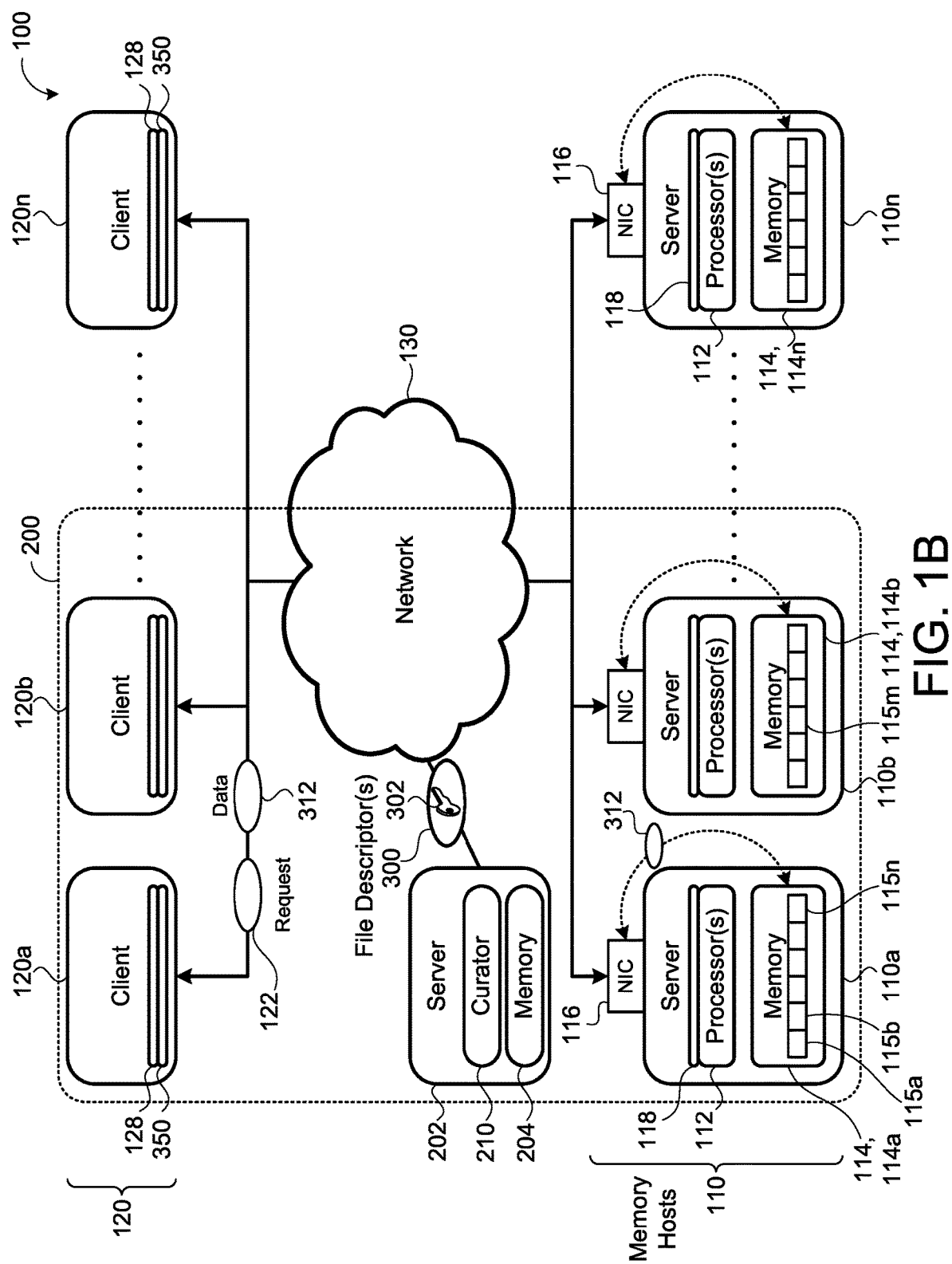
FIG. 1B is a schematic view of an exemplary distributed storage system having a cell of memory hosts managed by a curator.

Storage systems include multiple layers of redundancy where data is replicated and stored in multiple data centers. Data centers house computer systems and their associated components, such as telecommunications and storage systems 100 (FIGS. 1A-1B). Data centers usually include backup power supplies, redundant communications connections, environmental controls (to maintain a constant temperature), and security devices. Data centers may be large industrial scale operations that use a great amount of electricity (e.g., as much as a small town). Data centers may be located in different geographical locations (e.g., different cities, different countries, and different continents). In some examples, the data centers, or portions thereof, require maintenance (e.g., due to a power outage or disconnecting a portion of the storage system for replacement of parts, a system failure, or a combination thereof). Therefore, it is desirable to provide a distributed storage system 100 capable of recovering and reconstructing data lost during any system failures.

Referring to FIGS. 1A-1B, in some implementations, a distributed storage system 100 includes loosely coupled memory hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks) that may be used for caching data. A storage abstraction (e.g., key/value store or file system) overlain on the storage resources 114 allows scalable use of the storage resources 114 by one or more clients 120, 120a-n. The clients 120 may communicate with the memory hosts 110 through a network 130 (e.g., via RPC).

In some implementations, the distributed storage system 100 is "single-sided," eliminating the need for any server jobs for responding to remote procedure calls (RPC) from clients 120 to store or retrieve data 312 on their corresponding memory hosts 110 and may rely on specialized hardware to process remote requests 122 instead. "Single-sided" refers to the method by which most of the request processing on the memory hosts 110 may be done in hardware rather than by software executed on CPUs 112 of the memory hosts 110. Rather than having a processor 112 of a memory host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the memory host 110. In other words, a client process 128 executing on a client 120 may directly interface with one or more storage resources 114 without requiring execution of a routine of any server processes 118 executing on the computing resources 112. This single-sided distributed storage architecture offers relatively high-throughput and low latency, since clients 120 can access the storage resources 114 without interfacing with the computing resources 112 of the memory hosts 110. This has the effect of decoupling the requirements for storage 114 and CPU 112 cycles that typical two-sided distributed storage systems 100 carry. The single-sided distributed storage system 100 can utilize remote storage resources 114 regardless of whether there are spare CPU 112 cycles on that memory host 110; furthermore, since single-sided operations do not contend for server CPU 112 resources, a single-sided system 100 can serve cache requests 122 with very predictable, low latency, even when memory hosts 110 are running at high CPU 112 utilization. Thus, the single-sided distributed storage system 100 allows higher utilization of both cluster storage 114 and CPU resources 112 than traditional two-sided systems, while delivering predictable, low latency.

In some implementations, the distributed storage system 100 includes a storage logic portion 102, a data control portion 104, and a data storage portion 106. The storage logic portion 102 may include a transaction application programming interface (API) 350 (e.g., a single-sided transactional system client library) that is responsible for accessing the underlying data, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the memory hosts 110, handling errors in case of machine failures, etc. The data storage portion 106 may include the loosely coupled memory hosts 110, 110a-n.

The distributed storage system 100 may store data 312 in dynamic random access memory (DRAM) 114 and serve the data 312 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130. Both the memory hosts 110a-n and the client 120 may each have a network interface controller 116 for network communications. A host process 118 executing on the computing processor 112 of the memory host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the memory host 110 creates a client key 302 for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 350 translates commands, such as look-up or insert data commands, into sequences of primitive network interface controller operations. The transaction API 350 interfaces with the data control and data storage portions 104, 106 of the distributed storage system 100.

The distributed storage system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding memory hosts 110.

Referring to FIG. 1B, in some implementations, the distributed storage system 100 includes multiple cells 200, each cell 200 including memory hosts 110 and a curator 210 in communication with the memory hosts 110. The curator 210 (e.g., process) may execute on a computing processor 202 (e.g., server having a non-transitory memory 204) connected to the network 130 and manage the data storage (e.g., manage a file system stored on the memory hosts 110), control data placements, and/or initiate data recovery. Moreover, the curator 210 may track an existence and storage location of data 312 on the memory hosts 110. Redundant curators 210 are possible. In some implementations, the curator(s) 210 track the striping of data 312 across multiple memory hosts 110 and the existence and/or location of multiple copies of a given stripe for redundancy and/or performance. In computer data storage, data striping is the technique of segmenting logically sequential data 312, such as a file 310 (FIG. 2), in a way that accesses of sequential segments are made to different physical storage devices 114 (e.g., cells 200 and/or memory hosts 110). Striping is useful when a processing device requests access to data 312 more quickly than a storage device 114 can provide access. By performing segment accesses on multiple devices, multiple segments can be accessed concurrently. This provides more data access throughput, which avoids causing the processor to idly wait for data accesses.

In some implementations, the transaction API 350 interfaces between a client 120 (e.g., with the client process 128) and the curator 210. In some examples, the client 120 communicates with the curator 210 through one or more remote procedure calls (RPC). In response to a client request 122, the transaction API 350 may find the storage location of certain data 312 on memory host(s) 110 and obtain a key 302 that allows access to the data 312. The transaction API 350 communicates directly with the appropriate memory hosts 110 (via the network interface controllers 116) to read or write the data 312 (e.g., using remote direct memory access). In the case that a memory host 110 is non-operational, or the data 312 was moved to a different memory host 110, the client request 122 fails, prompting the client 120 to re-query the curator 210.

Figure 2:
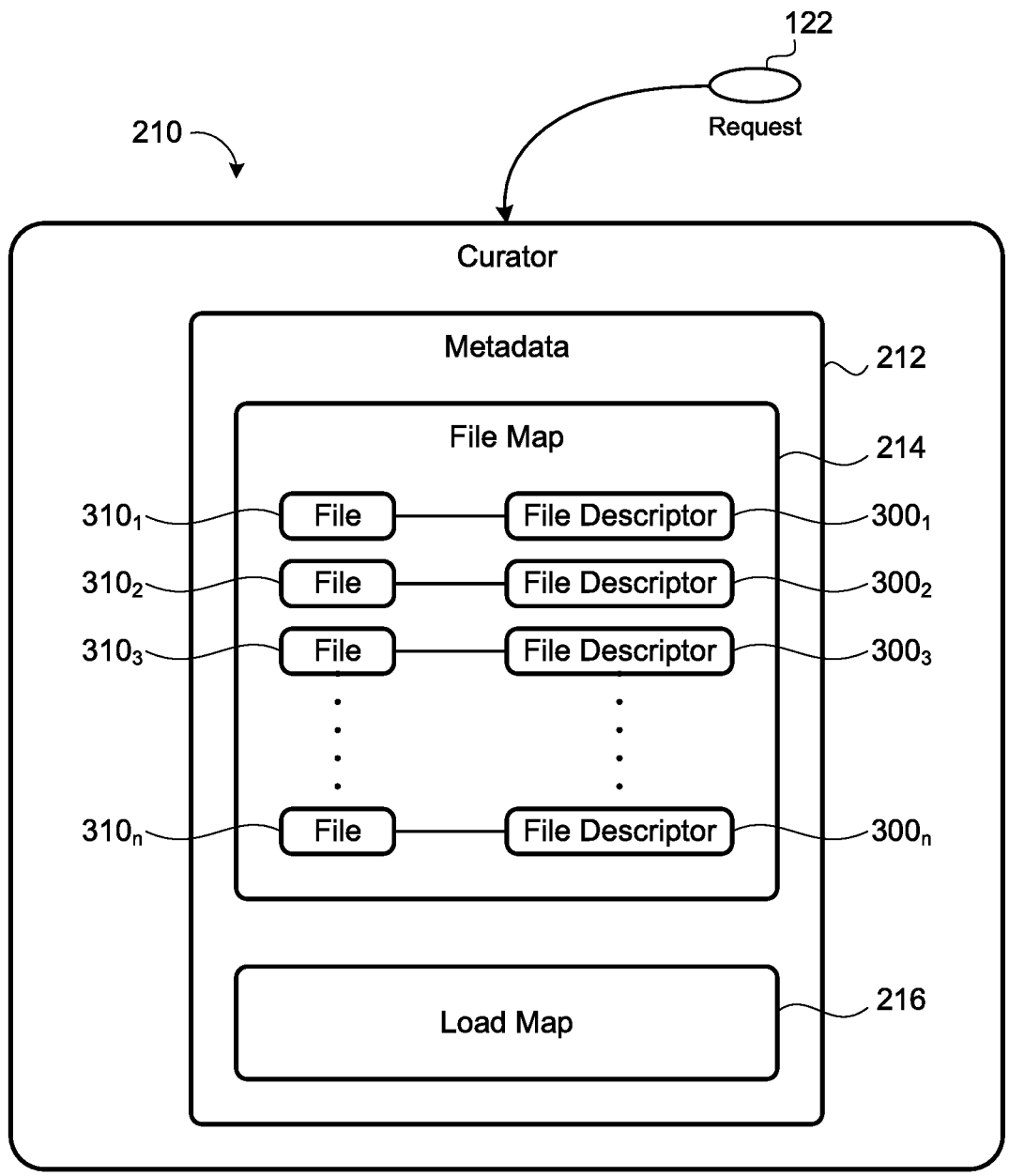
FIG. 2 is a schematic view of an exemplary curator for a distributed storage system.

Referring to FIG. 2, in some implementations, the curator 210 stores and manages file system metadata 212. The metadata 212 may include a file map 214 that maps files $310 1\text{-}n$ to file descriptors $300_{1\text{-}n}$. The curator 210 may examine and modify the representation of its persistent metadata 212. The curator 210 may use three different access patterns for the metadata 212: read-only; file transactions; and stripe transactions.

Figure 3A:
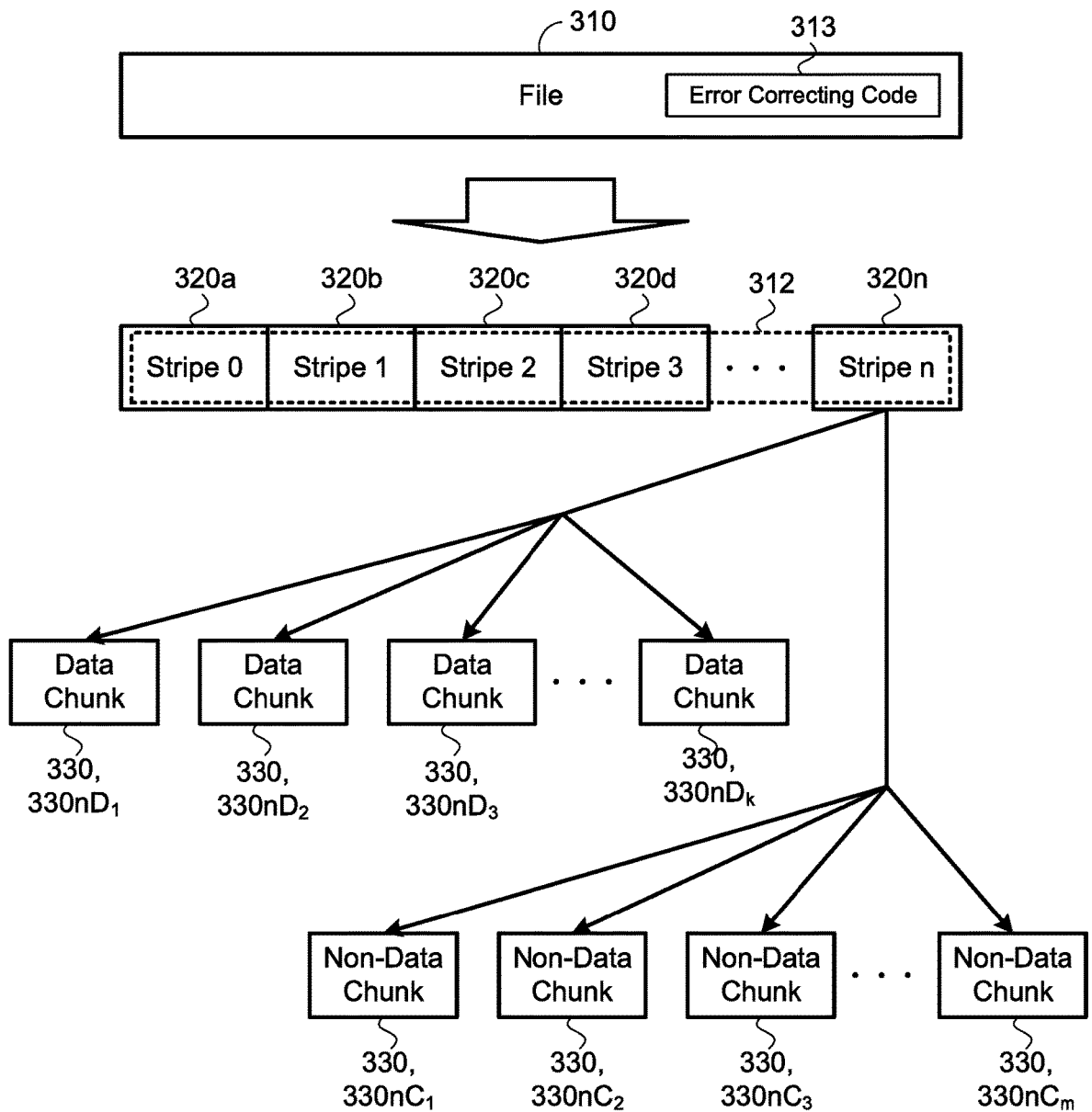
FIG. 3A is a schematic view of an exemplary file split into data chunks and non-data chunks.

Referring to FIGS. 2 and 3A, in some implementations, file descriptors $300_{1\text{-}n}$ stored by the curator 210 contain metadata 212, such as the file map 214, which maps the stripes 320a-n to data chunks 330nD and code chunks 330nC stored on the memory hosts 110. To open a file 310, a client 120 sends a request 122 to the curator 210, which returns a file descriptor 300. The client 120 uses the file descriptor 300 to translate file chunk offsets to remote memory locations 115a-n. The file descriptor 300 may include a client key 302 (e.g., a 32-bit key) that is unique to a chunk 330 on a memory host 110 and is used to RDMA-read that chunk 330. After the client 120 loads the file descriptor 300, the client 120 may access the data 312 of a file 310 via RDMA or another data retrieval method.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying a client 120 to gather latency statistics from a client's point of view. In some examples, the curator 210 uses the memory host status information to make rebalancing, draining, recovery decisions, and allocation decisions.

The curator(s) 210 may allocate chunks 330 in order to handle client requests 122 for more storage space in a file 310 and for rebalancing and recovery. In some examples, the processor 202 replicates chunks 330 among the storage devices 114 differently than distributing the data chunks 330nD and the code chunks 330nC among the storage devices 114. The curator 210 may maintain a load map 216 of memory host load and liveliness. In some implementations, the curator 210 allocates a chunk 330 by generating a list of candidate memory hosts 110 and sends an allocate chunk request to each of the candidate memory hosts 110. If the memory host 110 is overloaded or has no available space, the memory host 110 can deny the request 122. In this case, the curator 210 selects a different memory host 110. Each curator 210 may continuously scan its designated portion of the file namespace, examining all the metadata 212 every minute or so. The curator 210 may use the file scan to check the integrity of the metadata 212, determine work that needs to be performed, and/or to generate statistics. The file scan may operate concurrently with other operations of the curator 210. The scan itself may not modify the metadata 212, but schedules work to be done by other components of the system and computes statistics.

Referring to FIG. 3A, data 312 may be one or more files 310, where each file 310 has a specified encoding level 313, e.g., Reed-Solomon Encoding 313a or nested codes 313b. The curator 210 may divide each file 310 into a collection of stripes 320a-n, with each stripe 320a-n being encoded independently from the remaining stripes 320a-n. As shown in FIG. 3A, each stripe 320 is divided into data-chunks 330nD and non-data chunks 330nC based on an encoding level 313, e.g., Reed-Solomon Codes 313a (FIG. 3B)—or nested codes 313b (FIGS. 3D-3G). The non-data chunks 330nC may be code chunks 330nC (e.g., for Reed Solomon codes 313a). In other examples, the non-data chunks 330nC may be code-check chunks 330nCC, word-check chunks 330nWC, and code-check-word-check chunks 330nCCWC (e.g., for nested coding 313b).

A data chunk 330nD is a specified amount of data 312. In some implementations, a data chunk 330nD is a contiguous portion of data 312 from a file 310. In other implementations, a data chunk 330nD is one or more non-contiguous portions of data 312 from a file 310. For example, a data chunk 330nD can be 256 bytes or other units of data 312.

A damaged chunk 330 (e.g., data chunk 330nD or non-data chunk 330nC) is a chunk 330 containing one or more errors. Typically, a damaged chunk 330 is identified using an error detecting code 313. For example, a damaged chunk 330 can be completely erased (e.g., if the chunk 330 was stored in a hard drive destroyed in a hurricane), or a damaged chunk 330 can have a single bit flipped. A healthy chunk 330 is a chunk 330 that is not damaged. A damaged chunk 330 can be damaged intentionally, for example, where a particular memory host 110 is shut down for maintenance. A damaged chunk may be a missing or unavailable chunk. In that case, damaged chunks 330 can be identified by identifying chunks 330 that are stored at memory hosts 110 that are being shut down.

The non-data chunks 330nC of a file 310 include the error-correcting code chunk 313. The error-correcting code chunk 313 includes a chunk 330 of data 312 based on one or more data-chunks 330nD. In some implementations, each code chunk 330nC is the same specified size (e.g., 256 bytes) as the data chunks 330nD. The code chunks 330nC are generated using an error-correcting code 313, e.g., a Maximal Distance Separable (MDS) code. Examples of MDS codes include Reed-Solomon codes 313a. Various techniques can be used to generate the code chunks 330nC. In general, any error-correcting code 313 can be used that can reconstruct data chunks 330nD from any set of unique, healthy chunks 330 (either data chunks 330nD or code chunks 330nC).

A codeword is a set of data chunks 330nD and code chunks 330nC based on those data chunks 330nD. If an MDS code is used to generate a codeword containing d data chunks 330nD and c code chunks 330nC, then all of the chunks 330 (data or code) can be reconstructed as long as any healthy chunks 330 (data or code) are available from the codeword.

Figure 3B:
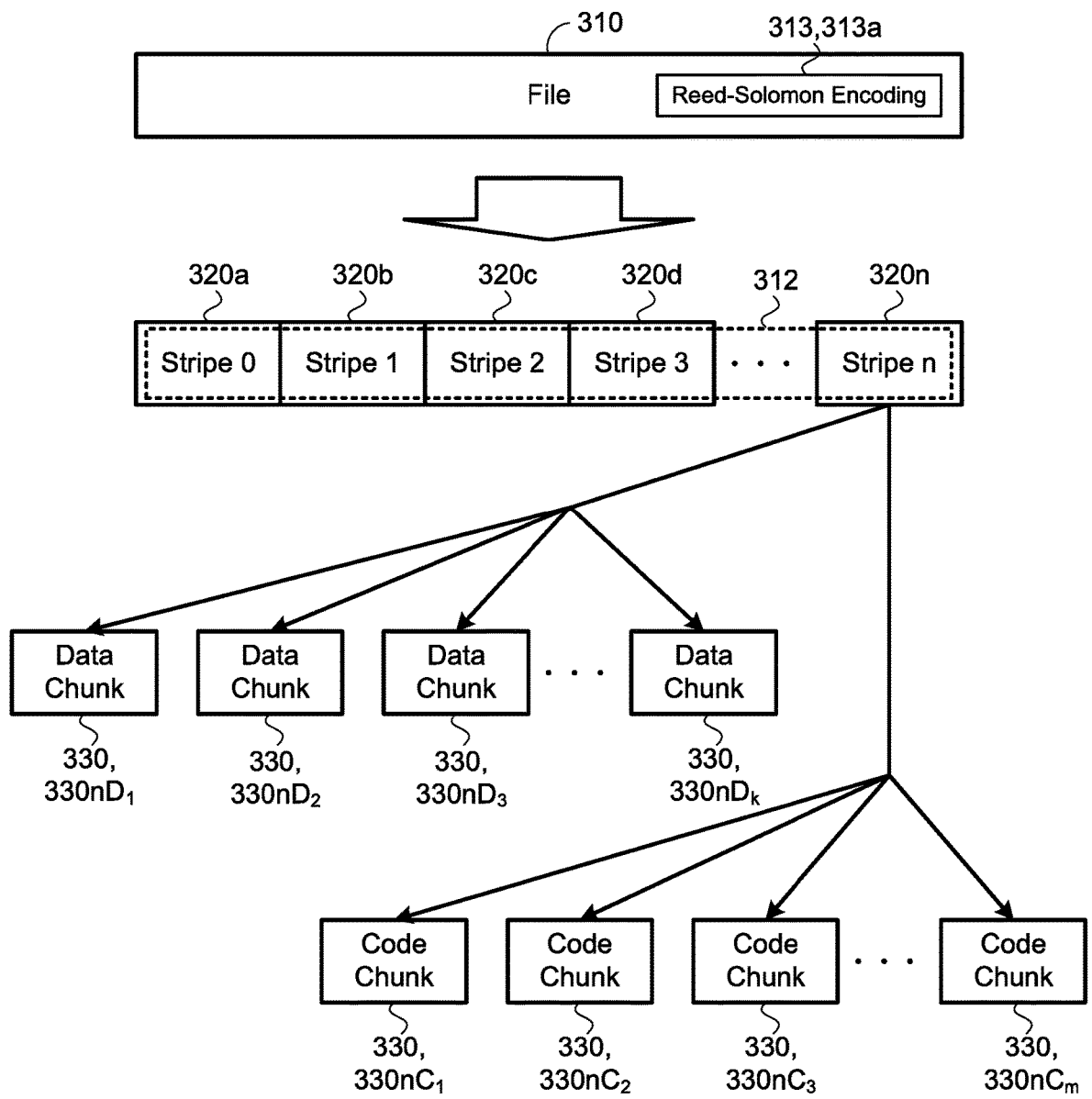
FIG. 3B is a schematic view of an exemplary file split into data chunks and code chunks.
Figure 3C:
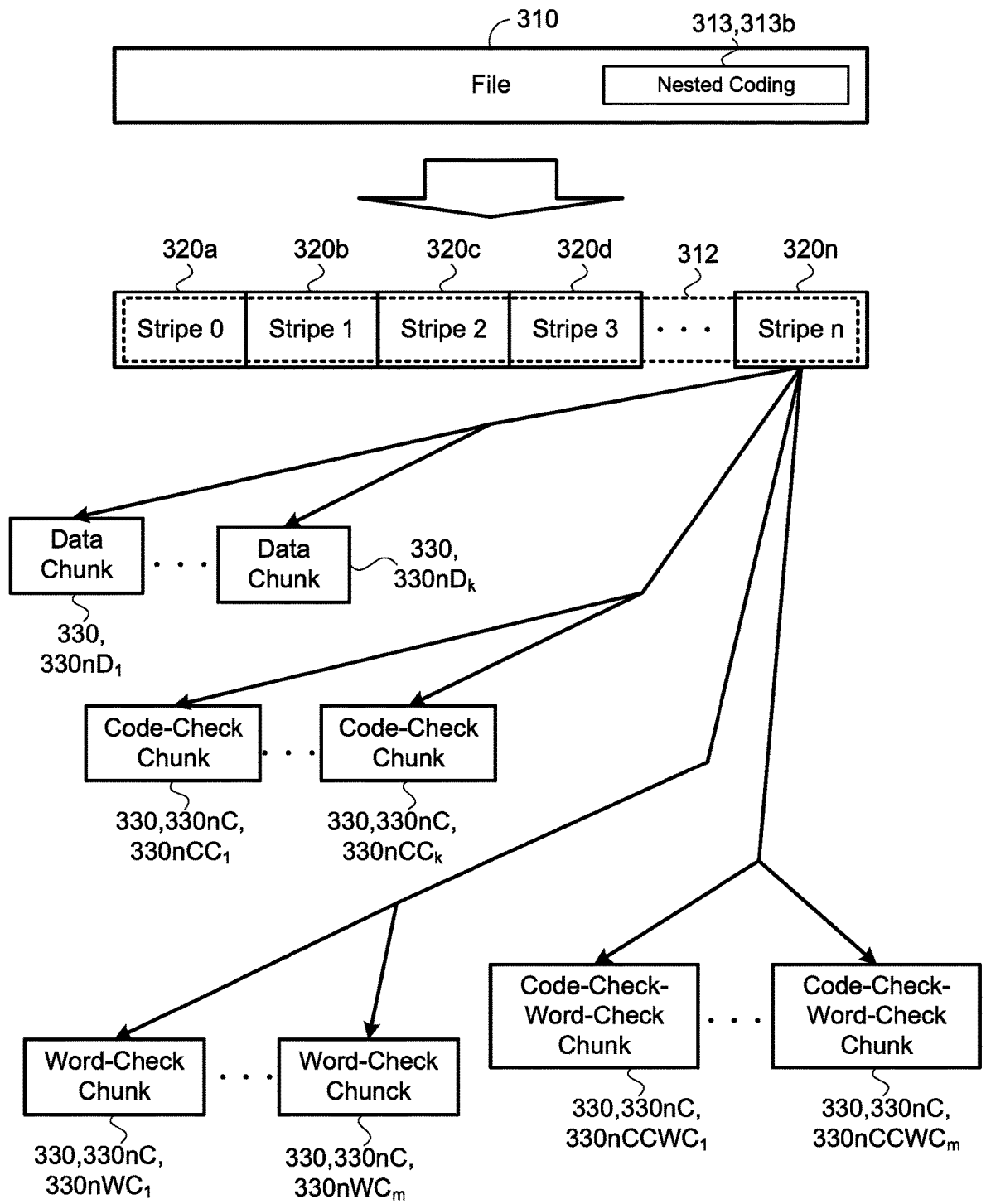
FIG. 3C is a schematic view of an exemplary file split into data chunks, code-check chunks, word-check chunks, and code-check-word-check chunks.

FIG. 3B shows a Reed-Solomon encoding 313a as the error-correcting code chunks 313. Each stripe 320 is divided into chunks 330 stored on multiple storage resources 114. The chunks 330 may be data chunks $330nD_k$ or code chunks $330nC_m$, which together form a single code word. The data chunks $330nD_k$ include the actual data 312; while the code chunks $330nC_m$ are for parity to determine if the file 310 is intact. The Reed-Solomon encoding 313a allows for the loss of up to the total number of code chunks $330nC_m$ where the stripe 312 may still be reconstructed from the data chunk $330nD_k$. Therefore, each stripe 320a-n of a file 310 consists of multiple data chunks $330nD_k$ and code chunks $330nC_m$ that the curator 210 places on multiple storage resources 114, where the collection of data chunks $330nD_k$ and code chunks $330nC_m$ forms a single code word. In general, the curator 210 may place each stripe 320a-n on storage resources 114 independently of how the other stripes 320a-n in the file 310 are placed on storage resources 114. The Reed-Solomon Encoding 313a adds redundant data 312, or parity data 312 to a file 310, so that the file 310 can later be recovered by a receiver even when a number of errors (up to the capability of the code being used) were introduced. Reed-Solomon Encoding 313a is used to maintain data integrity in memory hosts 110, to reconstruct data 312 for performance (latency), or to more quickly drain machines.

Figure 3D:
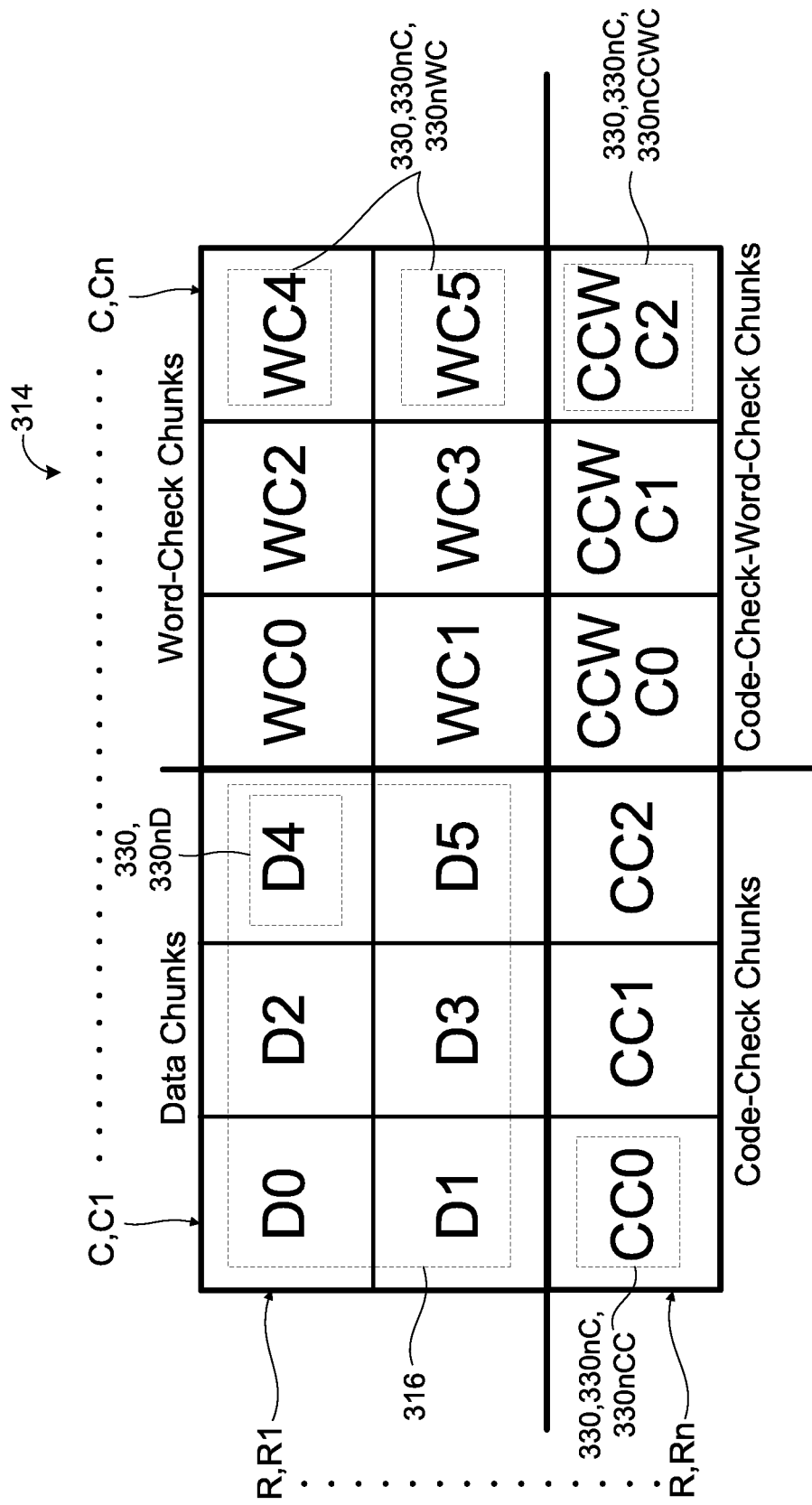
FIG. 3D is a schematic view of exemplary nested coding technique.
Figure 3E:
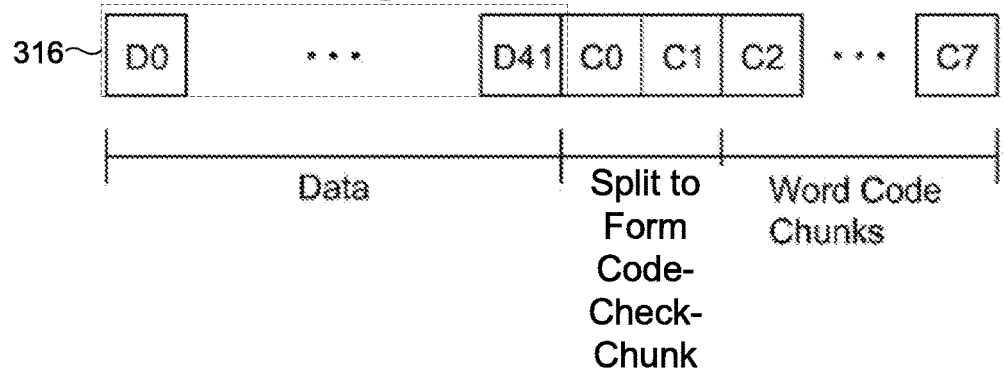
FIGS. 3E-3G are schematic views of exemplary nested coding techniques.
Figure 3F:
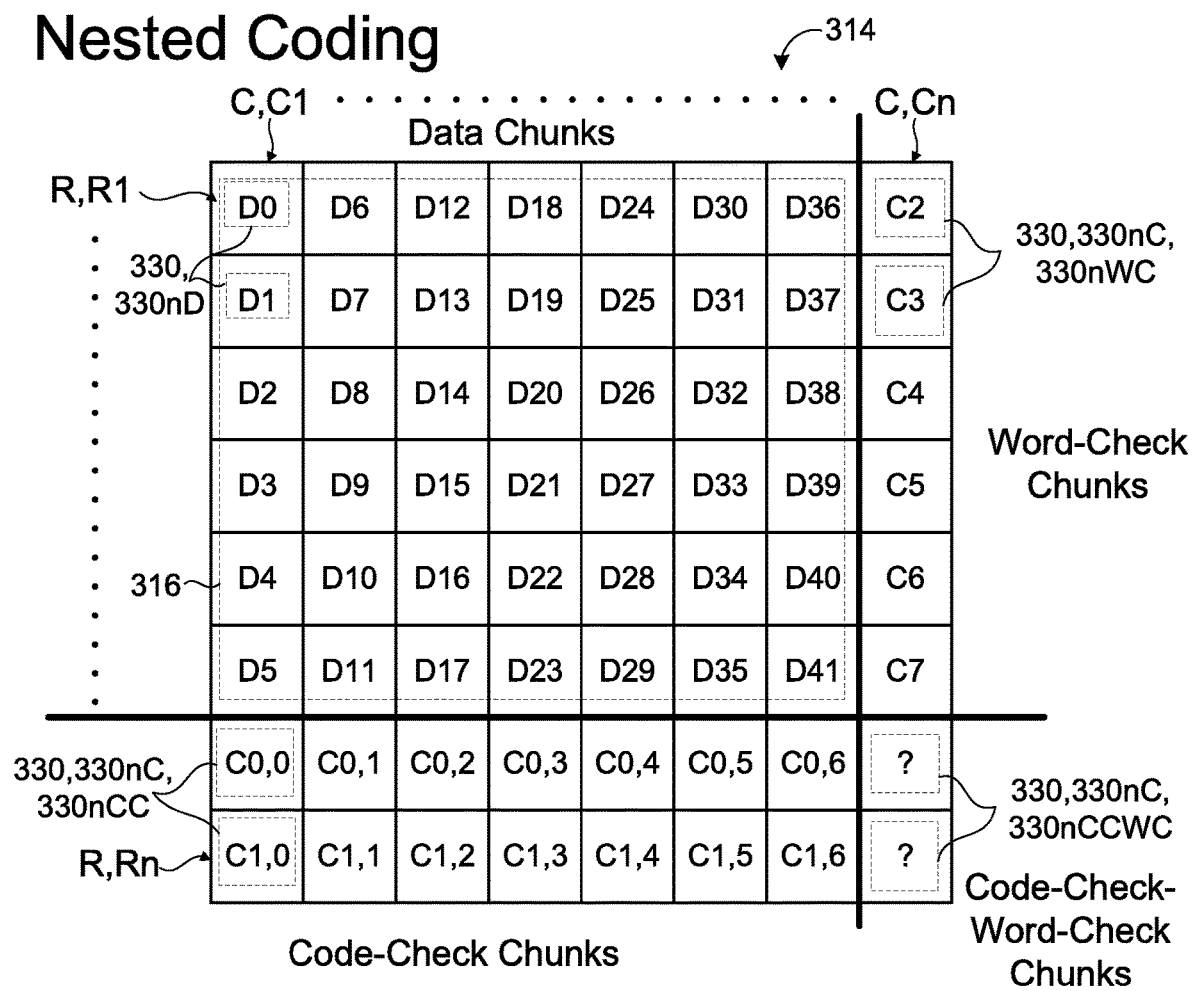

Referring to FIGS. 3C-3H, in nested coding 313b techniques, an encoded data block 314 includes a data block 316 (having data chunks 330nD) and error-correcting code chunks (i.e., non-data chunks 330nC) that is being stored is viewed as forming a two dimensional R×C array. There are X code chunks 330nC for each column C (called "code-check "code-check chunks 330nCC") that can be used to reconstruct X or fewer damaged chunks 330 per column. There are Y code chunks 330nC (called "word-check chunks 330nWC") for the entire 2-D array. When there are more than X damaged chunks 330 in one or more columns C, the word-check chunks 330$n$WC are used in addition to other healthy chunks 330 to reconstruct damaged chunks 330. Although some examples described in this specification illustrate encoded data blocks 314 (i.e., data block 316 and code chunks 330$n$C (i.e., non-data chunks 330$n$C)) as forming a two dimensional array, it is possible for coding techniques to create encoded data blocks 314 configured differently. For instance, different columns can have different numbers of code-check chunks 330$n$CC (i.e., the code-check chunk 330$n$CC), and columns C that contain word-check chunks 330$n$WC can have different numbers of rows than columns that contain data chunks 330$n$D and code-check chunks 330$n$C. FIGS. 3D and 3F show examples of a stripe 320 encoded using different methods (i.e., arrays) of nested coding 313$b$ having different array values. FIG. 3D includes less data chunks 330$n$D than FIG. 3E. FIG. 3D shows three columns of word-check chunks 330$n$WC, while FIG. 3E shows one column of word-check chunks 330$n$WC. Moreover, FIG. 3D shows one row of code-check chunks 330$n$CC, while FIG. 3E shows two rows of code-check chunks 330$n$CC. Lastly, FIG. 3D includes three code-check-word-check chunks 330$n$CCWC while FIG. 3E includes two code-check-word-check chunks 330$n$CCWC.

The codes 330$n$C can be used to store data 312 across memory hosts 110 by allocating each column C of data chunks 330$n$D to a data center. Each chunk 330 within the columns C can be allocated to a memory host 110 within a data center. Then, if X or fewer chunks 330 are lost at a data center, the chunks 330 can be reconstructed using only intra-data center communication (e.g., so no other data centers have to provide data 312 in performing reconstruction). If more than X chunks 330 are lost in one or more data centers, then the Y word-check chunks 330$n$WC are used to attempt reconstruction. Thus, inter-data center communication (which may be more expensive, e.g., slower than intra-data center communication) is only needed when more than X chunks 330 are damaged within a single data center.

The codes can also be used within a single data center. Instead of allocating different columns C to different data centers, the encoding system 102 stores all of the columns at a single data center. The data chunks 330$n$D and code chunks 330$n$C can be stored at distinct memory hosts 110 within that data center. This is useful, for example, where reading data 312 from memory hosts 110 during reconstruction is expensive (e.g., time consuming), so that the encoding system 102 can read fewer chunks 330 during reconstruction than would be needed using conventional coding techniques. Small numbers of damaged chunks 330 can be reconstructed by reading small numbers of other chunks 330 (code-check chunks 330$n$CC and other data chunks 330$n$D in the column C), and large numbers of damaged chunks 330 can be reconstructed using the word-check chunks 330$n$WC when needed.

Figure 3G:
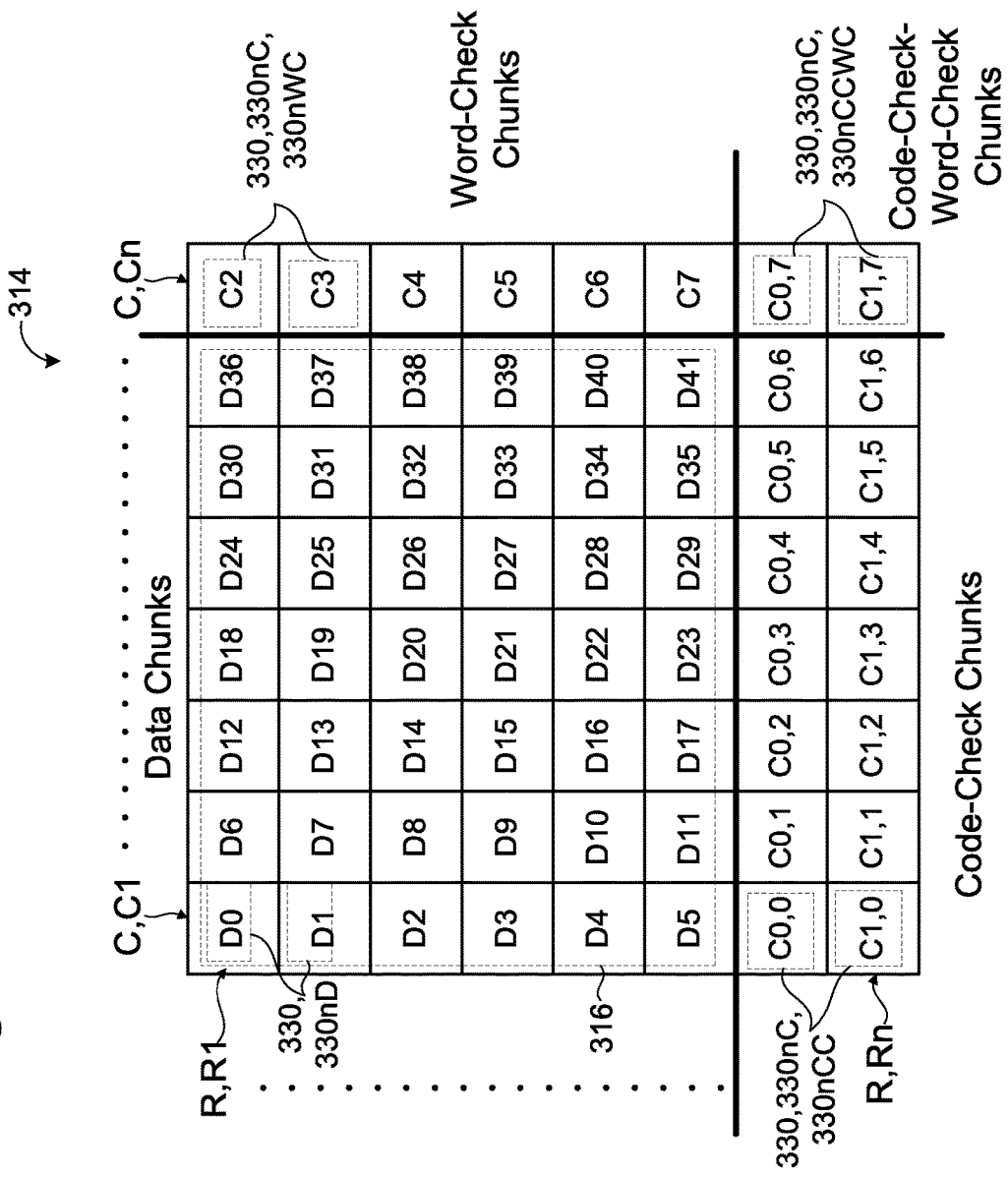

Referring to FIGS. 3E-3G, in some implementations, a nested coding 313$b$ technique shows data chunks 330$n$D and code chunks 330$n$C that form a codeword. As shown, the nested coding 313$b$ technique is a two dimensional (2D) nested coding 313$b$ technique, but a three dimensional (3D) nested coding 313$b$ technique may also be applied. A 2D nested code 313$b$ is created from an arbitrary linear MDS code in systematic form. Word-check chunks 330$n$WC that are based on a data block 316 are partitioned into two groups, the first group including X code chunks 330$n$C and the second group including N code chunks 330$n$C. The data block 316 is viewed as forming an array of columns C, and X code chunks 330$n$C in the first group are used to create X column chunks 330 per column by "splitting" them into separate components per column ("split" code-check chunks 330$n$CC). The N code chunks 330$n$C in the second group form word-check chunks 330$n$WC.

For example, FIG. 3E shows a data block (D0-D41) 316 where D0-D41 are data chunks 330$n$D and code chunks (C0-C7) 330$n$C that are based on the data block (D0-D41) 316. The data chunks (D0-D41) 330$n$D and the code chunks (C0-C7) 330$n$C form a codeword. The code chunks 330$n$C are partitioned into a first group that includes C0-C1 and a second group that includes C2-C7. C0-C1 are split to form split code-check chunks 330$n$CC. C2-C7 are used as word-check chunks 330$n$WC.

FIG. 3F shows a resulting encoded data block 314 that includes the data block (D0-D41) 316 and additional code chunks 330$n$C (split code-check chunks 330$n$CC and word-check chunks 330$n$WC). To generate a split code-check chunk 330$n$CC corresponding to C0 for column j (denoted C0,$j$), C0 is generated as though all the data chunks 330$n$D not in column j have the value zero. That is, C0,$j$ has the value that would result from performing the operations to generate C0 using the full data block 316 but instead using only the column j, with all of the other columns zeroed out. For example, if a generator matrix would be used to generate C0 for the full data block 316, then the generator matrix can be modified to generate C0,$j$ so that it has the value that would result from using the original generator matrix and applying that original generator matrix to the data block 316 with data chunks 330$n$D in columns other than column j zeroed out.

The split code-check chunks 330$n$CC for C1,$j$ for each column C are generated similarly, but using C1 instead of C0. As a result, C0 is a linear combination of C0,0-C0,6 and C1 is a linear Combination of C1,0-C1,6. That is, $$C0 = \sum_{j=0}^{6} C0, j; \text{ and} \qquad (1)$$

$$C1 = \sum_{j=0}^{6} C1, j. \qquad (2)$$

The chunks 330 denoted as "?" in FIG. 3F can be generated in various ways, e.g., as described further below with reference to FIG. 3G.

In the example of FIGS. 3E and 3F, the resulting encoded data block 314 includes 42 data chunks 330$n$D and 8 code chunks 330$n$C. Referring to the original code used to create the encoded data block 314, the code chunks 330$n$C belong to one of two groups as described above, X=2 of which are in the first group and N=6 of which are in the second group. Whenever there are two or fewer (X or fewer) damaged chunks 330 within one of the first seven columns, the damaged chunks 330 can be corrected using the healthy chunks 330 of the columns C and the split code-check chunks 330$n$CC for the column C. To see this, let j denote the column C including the two or fewer damaged chunks 330 and consider the codeword obtained by zeroing-out all the data chunks 330$n$D from columns C other than j. In that codeword, C0=C0,$j$ and C1=C1,$j$. As a result, the two or fewer damaged chunks 330 in other columns as containing all-zero data chunks 330$n$D, and by viewing the word-check chunks 330$n$WC as being damaged.

In the example shown in FIG. 3F, the word-check chunks 330$n$WC fully fill an entire column C (the column to the right). 2D nested codes 313$b$ can be created with an arbitrary number of columns C of word-check chunks 330nWC. The columns C of word-check chunks 330nWC can have the same number of rows R as the columns of data chunks 330nD or different numbers of rows R, and the columns C of word-check chunks 330nWC can have different numbers of rows R from each other. Columns C of word-check chunks 330nWC can, but do not have to, have code-check chunks 330nCC, i.e., code-check-word-check chunks 330nCCWC. Increasing the number of word-check chunks 330nWC improves the reliability of the stored data 312 but uses more storage at memory hosts 110. In general, for nested codes 313b, columns C include either data chunks 330nD or word-check chunks 330nWC and not both.

In general, a 2D nested code 313b with X split code-check chunks 330nCC per column C and N word-check chunks 330nWC can be used to reconstruct X damaged chunks 330 per column C (in those columns that include data chunks 330nD) while performing only intra-columns communication (which is typically, e.g., intra-data center communication). In reconstructing multiple damaged chunks 330 within the encoded data block 314, those damaged chunks 330 are typically reconstructed first because intra-column communication is less expensive than inter-column communication, but other damaged chunks 330 may remain. If, after reconstructing damaged chunks 330 within columns, (N+X) or fewer other chunks 330 are still damaged (because they were not able to be reconstructed using intra-column communication), those other damaged chunks 330 can be reconstructed using the word-check chunks 330nWC and the split code-check chunks 330nCC. The word-check chunks 330nWC in the first group (C0 and C1 in FIG. 4B) can be determined from the split code-check chunks 330nCC, e.g., using the formula $$C_i = \sum_{j=0}^{6} Ci, j,$$

even though those word-check chunks 330nWC are not explicitly stored.

To see this, let Z denote the number of word-check chunks 330nWC that are damaged and let Y denote the number of word-check chunks 330nWC in the first group that cannot be reconstructed from their corresponding split code-check chunks 330nCC according to the formula $$C_i = \sum_{j=0}^{6} C0,$$

j to split code-check chunks 330nCC being damaged. Using that formula, X−Y word-check chunks 330nWC from the first group can be determined, resulting in a codeword (e.g., the one shown in FIG. 3E) with Y damaged word-check chunks 330nWC in the first group and Z damaged word-check chunks 330nWC in the second group. Because there are at most N+X total damaged chunks 330, there are at most N+X−Y−Z damaged data chunks 330nD. Thus, it is possible to use the resulting codeword to reconstruct all of the damaged chunks 330, as it includes at most N+X−Y−Z+Y+Z=N+X damaged chunks 330.

Referring to FIG. 3G, in some implementations, the resulting encoded block 314 includes code-check chunks 330nCC for the word-check chunks 330nWC (i.e., code-check-word-check chunks 330nCCWC). Compared to the encoded block 314 of FIG. 3F, the encoded block 314 of FIG. 3G includes the code-check chunks C0,7 and C1,7 330nCC in place of the locations marked with "?" in FIG. 3F. This is one way to provide for reconstructing damaged word-check chunks 330nWC without relying on inter-column communication. The code-check chunks C0,7 and C1,7 330nCC can be generated in various ways. For example, those code-check chunks 330nCC can be generated based on C2-C7 in the same manner that C0,0 and C1,0 are generated based on D0-D5. The resulting encoded block 314 of FIG. 3G (using the example nested code 313b) can be used to reconstruct up to eight damaged chunks 330 after performing intra-column reconstruction. Code-check chunks 330nC can be added for any number of columns that include word-check chunks 330nWC.

Figure 3H:
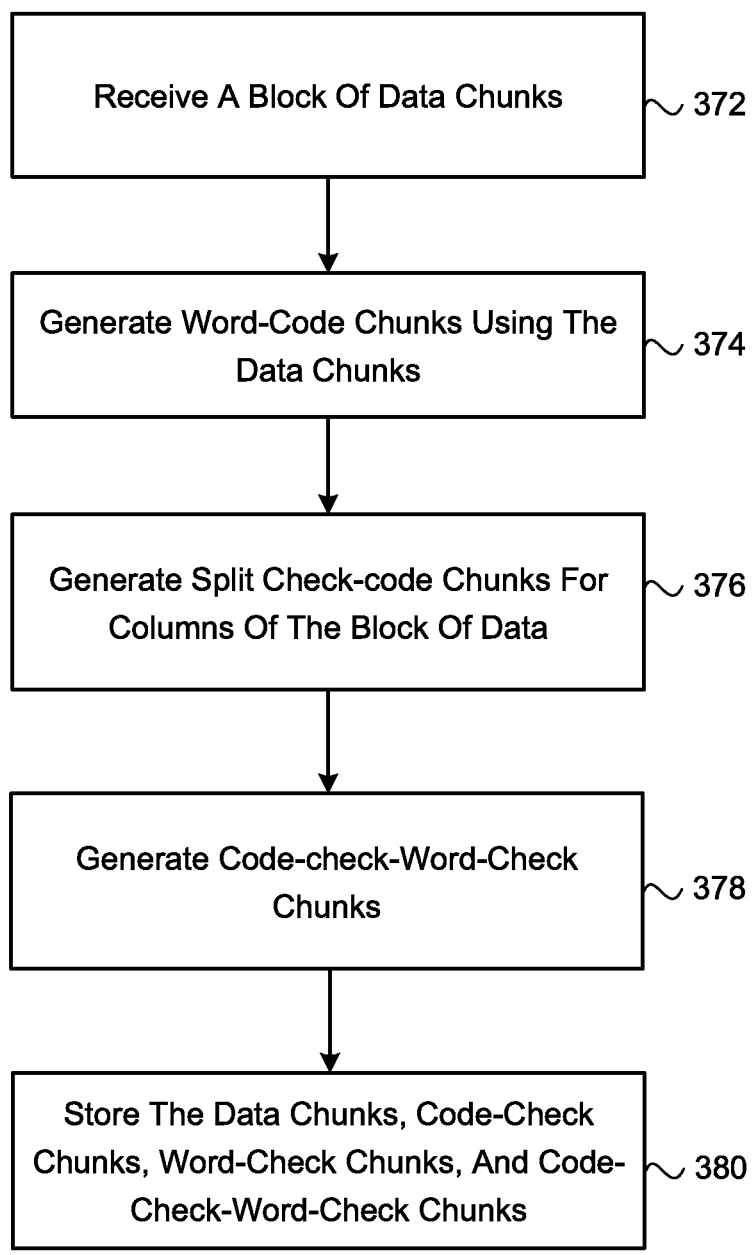
FIG. 3H is an exemplary arrangement of operations for storing data using nested coding techniques.

Referring to FIG. 3H, in some implementations, the curator 210 distributes data 312 using a nested code 313b. The system 100 receives a data block 316 (step 372). The data block 316 can include $m_d*n_d$ data chunks 330nC, $m_d$ is a number of data rows and $n_d$ is a number of data columns, and $m_d$ and $n_d$ are greater than or equal to one. The encoded block 314 includes m*n chunks 330 that include mend, where m is the total number of rows R of data chunks 330nD and non-data chunks 330nC, and n is the number of columns C of data chunks 330nD and non-data chunks 330nC; m and n are greater than or equal to one. The system 100 generates one or more columns C of word-check chunks 330nWC using a first linear error-correcting code 313 in systematic form and the data chunks 330nD (step 374). The word-check chunks 330nWC and the data chunks 330nD of the same row R form a codeword. For each of $m_d$ row of data chunks 330nC, the system 100 generates one or more split code-check chunks 330nCC for the Column C (step 376). The split code-check chunks 330nCC are generated so that a linear combination of n split code-check chunks330nCC from different columns C forms a first word-check chunk 330nWC of a first codeword including the data chunks 330nD and the m word-check chunks 330nWC. The first word-check chunk 330nWC (and any other word-check chunks 330nWC resulting from a linear combination of split code-check chunks 330nCC from different columns C) forms a codeword with the data chunks 330nD and the word-check chunks 330nWC generated in step 374. For example, the split code-check chunks 330nCC for each columns C can be generated using a splitting error-correcting code 313 and the $m_d$ data chunks 330nD or the word-check chunks 330nWC, wherein the splitting error-correcting code 313 includes a splitting generator matrix that codes the same as a generator matrix for the first linear error-correcting code 313 applied to the data chunks 330nD with the data chunks 330nD zeroed-out for columns C other than the column C.

The system 100 stores the column C of data chunks 330nD and the split code-check chunks 330nCC and the word-check chunks 330nWC (step 378). In some implementations, the system 100 stores all the chunks 330 at a single group of memory hosts 110. In some other implementations, the system 100 allocates each column C to a distinct group of memory hosts 110. When the system 100 identifies one or more damaged chunks 330, the system 100 can reconstruct the damaged chunks 330 using the split code-check chunks 330nCC and the word-check chunks 330nWC. Typically, the system 100 attempts to reconstruct damaged chunks 330 using the split code-check chunks 330nCC and other data chunks in the same column C. If, after reconstructing damaged chunks 330 using only the split code-check chunks 330nCC, some damaged chunks 330 remain, the system 100 uses the word-check chunks 330nWC for reconstruction, including the word-check chunks 330nWC that can be determined by determining a linear combination of the split code-check chunks 330nCC. In some examples, when there are multiple losses, the system 100 uses any of the chunks 330 including data chunks 330nD.

The storage system 100 or portions thereof may undergo a system failure for a period of time. The data 312 distributed on the memory hosts 110 of the storage system 100 may not be available for users. For example, referring back to FIG. 1C, a memory host 110a may be undergoing maintenance or has a system failure; therefore, data 312 (e.g., stripe replicas 330n, data chunks 330nD and code chunks 330nC) stored on the memory host 110a may not be retrieved. In addition, the memory host 110a may take an extended period of time (e.g., a week) to be functional or for maintenance to be completed. Within the period during which the memory host 110a is not available, the storage system 100 recovers the lost data 312 so that the data 312 is available if a user makes a file request 122.

In some implementations, damaged chunks 330 may be recovered using healthy chunks 330. As previously described, damaged chunks (e.g., data chunks 330nD or non-data chunks 330nC) may be damaged due to various reasons. Damaged chunks 330 within a stripe 320 may be recovered from the healthy chunks 330. In some examples, the system 100 determines an order of the chunks 330 to be recovered within each stripe 320 by first identifying the missing or unhealthy chunks 330 and then identifying the healthy chunks 330 that are available for reconstructing the missing chunks 330. In some examples, a temporarily unavailable chunk 330, such as a chunk 330 on a memory host 110 that is restarting should not be recovered and should not be used as a source for recovering other unhealthy or missing chunks 330. The system 100 determines a number of chunks 330 that it can recover in one recovery cycle. A recovery cycle may entail reconstruction of a threshold number of chunks 330, reconstruction of chunks 330 within a period of time, and/or within execution of a recovery instruction set on a data processing device. The recovery cycle may result in reconstruction of the minimum number of missing chunks 330 and the maximum number of chunks 330 to be recovered according to system parameters. The system 100 determines the maximum number of chunks 330 it may recover in one recovery cycle.

Figure 3I:
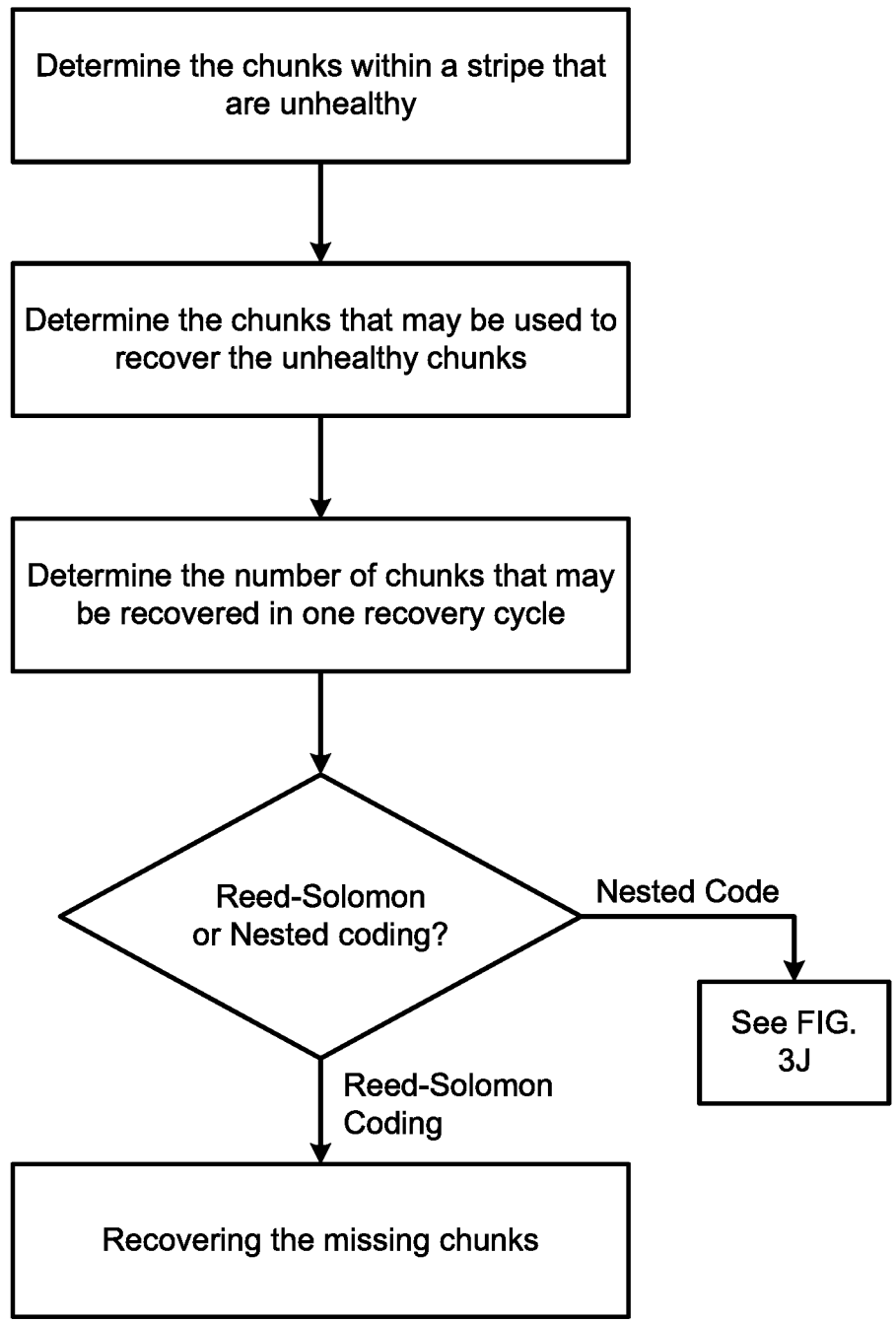
FIGS. 3I and 3J are exemplary flow charts for reconstructing a stripe having a Reed-Solomon code or a nested code.
Figure 3J:
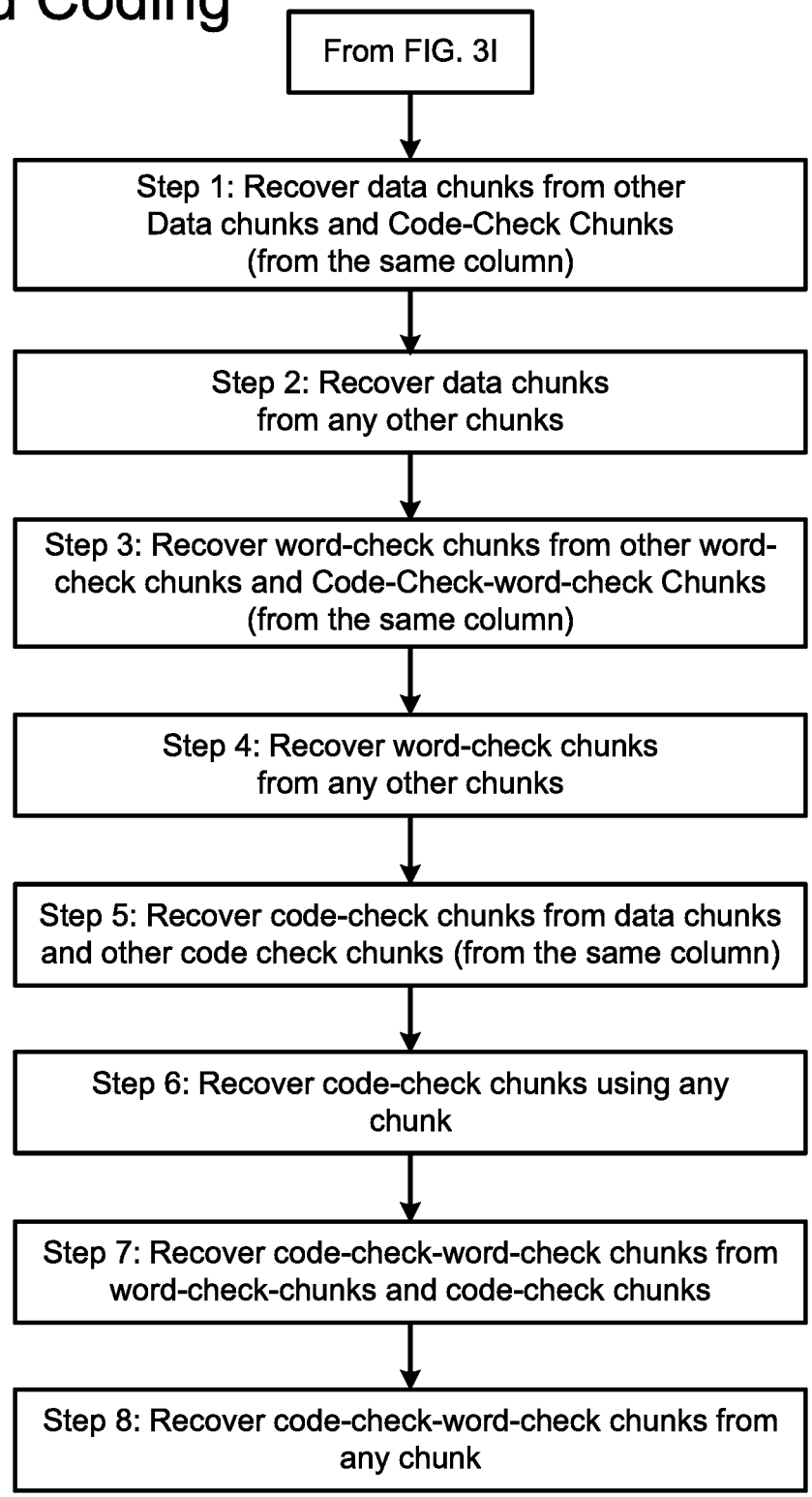

Referring to FIGS. 3I and 3J, in some implementations, the system 100 determines the chunks 330 within a stripe 310 that are unhealthy, and then the system 100 determines the chunks 330 within that stripe 310 that may be used to recover the unhealthy chunks 330. The system 100 then determines the number of chunks 330 that it can recover in one recovery cycle. Moreover, the system 100 determines the error coding 313 of the stripe 320 (e.g., Reed-Solomon coding 313a or nested coding 313b), and based on the coding 313 determines the order of chunk recovery. For example, when the stripe 320 includes a Reed-Solomon coding 313a, the system 100 determines a number of chunks 330 that it may reconstruct per recovery cycle of the distribution storage system 100 as a minimum number of the number of missing chunks 330 and a maximum number of chunks 330 allowed for reconstruction per recovery cycle. For Reed-Solomon encoding 313a, the system 100 selects missing data chunks 330nD over missing non-data chunks 330nC for reconstruction during each recovery cycle. The system 100 reconstructs the missing chunks 330 in an order that maximizes stripe durability. The system 100 recovers data chunks 330nD first to minimize the number of reconstruction done by the client 120 reading the data chunks 330nD. When data chunks 330nD are missing, users may need the missing data 312 and may read multiple chunks 330 to reconstruct the missing data 312.

Referring to FIG. 3J, for nested code, in step 1, the system 100 recovers data chunks (D) 330nD that can be reconstructed using data chunks 330nD and code-check chunks (CC) 330nCC only, i.e., without using word-check chunks (WC) 330nWC. In other words, the system 100 recovers missing data chunks (D) 330nD that can be reconstructed from other data chunks 330nD and code-check chunks (CC) 330nCC within the same column C. In step 2, the system 100 recovers data chunks (D) 330nD that cannot be reconstructed using data chunks 330nD and code-check chunks 330nCC from the same column C only, therefore the system may use any other chunks 330 of the encoded data block 314 (e.g., data chunks 330nD and/or code-check chunks 330nCC and/or word-check chunks 330nWC and/or code-check-word-check chunks 330nCCWC) (i.e., the system 100 recovers data chunks 330nD that cannot be reconstructed from data chunks 330nD and code-check chunks (CC) 330nCC within the same column C as the unhealthy data chunk 330nD from any other chunks 330). Once the system 100 recovers the data chunks 330nD, the system 100 recovers the non-data chunks 330nC by recovering, in step 3, the word-check chunks 330nWC that can be reconstructed using word-check chunks 330nWC and code-check word-check chunks 330mCCWC. In step 4, the system 100 recovers the word-check chunks 330nWC that cannot be recovered from word-check chunks 330nWC and code-check-word-check chunks 330nCCWC that are in the same column C as the unhealthy chunk 330, which means that the system 100 recovers the word-check chunks 330nWC from any other chunks 330 of the encoded data block 314 (e.g., data chunks 330nD and/or code-check chunks 330nCC and/or word-check chunks 330nWC and/or code-check-word-check chunks 330nCCWC). In step 5, the system 100 recovers code-check chunks 330nCC from data chunks 330nD and other code-check chunks 330nCC in the same column C as the unhealthy code-check chunks 330nCC. In step 6, the system 100 recovers code-check chunks 330nCC from any other chunks 330 of the encoded data block 314. In step 7, the system 100 recovers code-check-word-check chunks 330nCCWC from word-check chunks 330nWC and code-check chunks 330nC. Finally, in step 8, the system 100 reconstructs the code-check-word-check chunks 330nCCWC from any other chunks 330 of the encoded data block 314. As explained, the recovery order maximizes the stripe durability on each recovery, since recovering a word-check chunk 330nWC increases the stripe durability more than recovering a code-check chunk 330nCC due to the nature and properties of nested coding (which are not optimal and therefore not all chunks 330 are similar from a durability perspective).

Figure 3K:
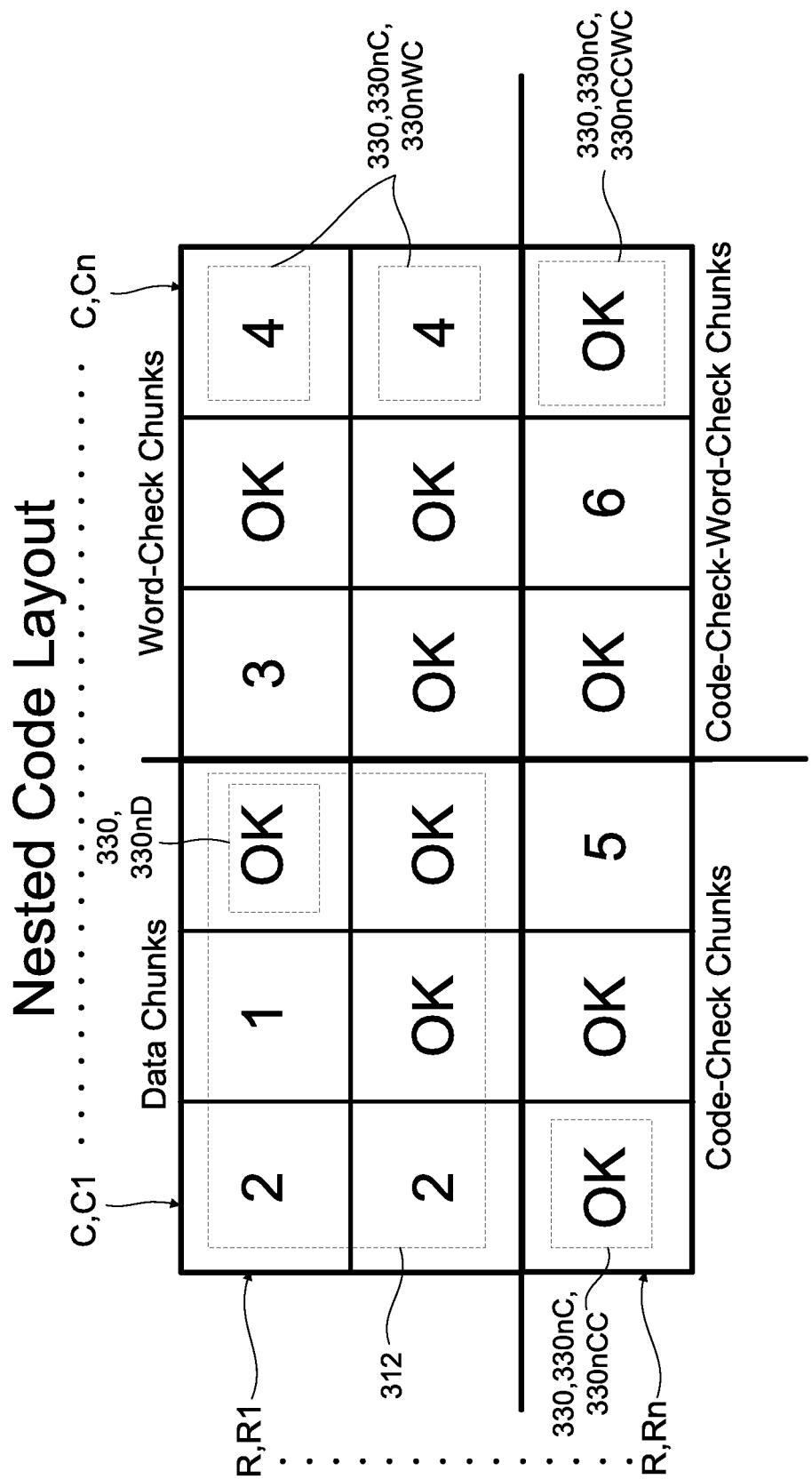
FIG. 3K is a schematic view of an exemplary order for reconstructing the stripe of FIG. 3D.

Referring to FIGS. 3D and 3K, a stripe 320 having data chunks D0-D5 330nD, code-check chunks CC0-CC2 330nCC, word-check chunks WC1-WC5 330nWC, and code-check-word-check chunks CCWC0-CCWC2 330nCCWC is shown. The stripe 320 includes missing chunks 330, such as data chunks D0, D1, and D2 330nD, code-check chunks CC2 330nCC, word-check chunks WC0, WC4, and WC5 330nWC, and code-check-word-check chunks CCWC1 330nCCWC. Following the described rule, the system 100, in step 1, reconstructs D2 because it can be reconstructed from using data chunk (D3) 330nD and code-check chunks (CC1) 330nCC only. The system 100, in step 2, recovers data chunks D0 and D1 330nD simultaneously in one recovery cycle, therefore using word-check chunks 330nWC and/or code-check word-check chunks 330nCCWC. In step 3, the system reconstructs word-check chunk (WC0) 330nWC from the other word-check chunk (WC1) 330nWC and the code-check-word-check chunk (CCW0) 330nCCWC. In step 4, the system 100 reconstructs the word-check chunks (WC4 and WC5) 330nWC from the code-check-word-check chunk (CCW2) 330nCCWC and/or data chunks 330nD. In step 5, the system 100 reconstructs the code-check chunk (CC2) 330nCC from the data chunks (D4 and D5) 330nD. In step 5, the system 100 reconstructs the missing code-check-word-check chunk (CCWC1) 330nCCWC from the word-check chunks (WC2 and WC3) 330nWC.

Referring to FIGS. 3D and 3L, in some implementations, the system 100 may recover the code-check chunks 330nCC before recovering the word-check chunks 330nWC and the code-check-word-check chunks 330nCCWC, i.e., the system 100 perform step 5 from FIG. 3J after performing step 2 and before performing step 3. The order described with respect to FIG. 3L, recovers the chunks 330 that require less resource, and therefore recovery may occur faster.

In some implementations, when the system 100 recovers more than one chunk 330 in one recovery cycle, the system 100 recovers all chunks 330 to the same memory host 110 and then moves all the recovered chunks 330 except for one chunk 330 to other memory hosts 110. When the system 100 successfully moves all the recovered chunks 330 to other memory hosts 110, the recovery phase may be completed.

Recovering multiple chunks 330 in one phase reduces the read operations. For example, when two chunks 330 are missing in the same column C, such as D0 and D1 from FIG. 3K or 3L, if the system 100 reconstructs the missing chunks 330 in separate phases the steps may be: the system 100 (e.g., Server A) reads 6 sources and decodes 1 missing chunk 330; then Server A writes 1 missing chunk 330; then Server B reads 6 sources and decodes 1 missing chunk 330; the system 100 (e.g., Server B) writes 1 missing chunk 330. This totals to 12 reads and 2 writes. However, if the system 100 reconstructs both data chunks D0 and D1 in one phase, the steps include: Server A reads 6 sources and decodes 2 missing chunks 330; Server A writes 2 missing chunks 330; Server B reads 1 source; Server B writes 1 missing chunk 330. This totals to 7 reads and 3 writes. Assuming the cost for reading and writing is roughly similar, by using this optimization; the number of reads and writes is reduced from 14 to 10 in this example.

In some implementations, for different storage hosts a different cost for reads and writes is assigned. Therefore, the different recovery strategies described may be used for recovering chunks 330. For example, reads from a Disk are more expensive compared to writes to a Disk, but reads from a Flash device (SSD) are cheaper compared to writes to SSD. Also, it is possible to read some chunks 330 from a Disk and some from SSD, and write some missing chunks 330 to a Disk and others to SSD in the case where a stripe 320 has chunks 330 on both SSD and Disk devices.

In some implementations, when the system is configured to recover only one chunk 330 at each step, then only one chunk 330 may be recovered, and that chunk 330 may be chosen randomly from the chunks 330 that can be recovered.

Figure 4:
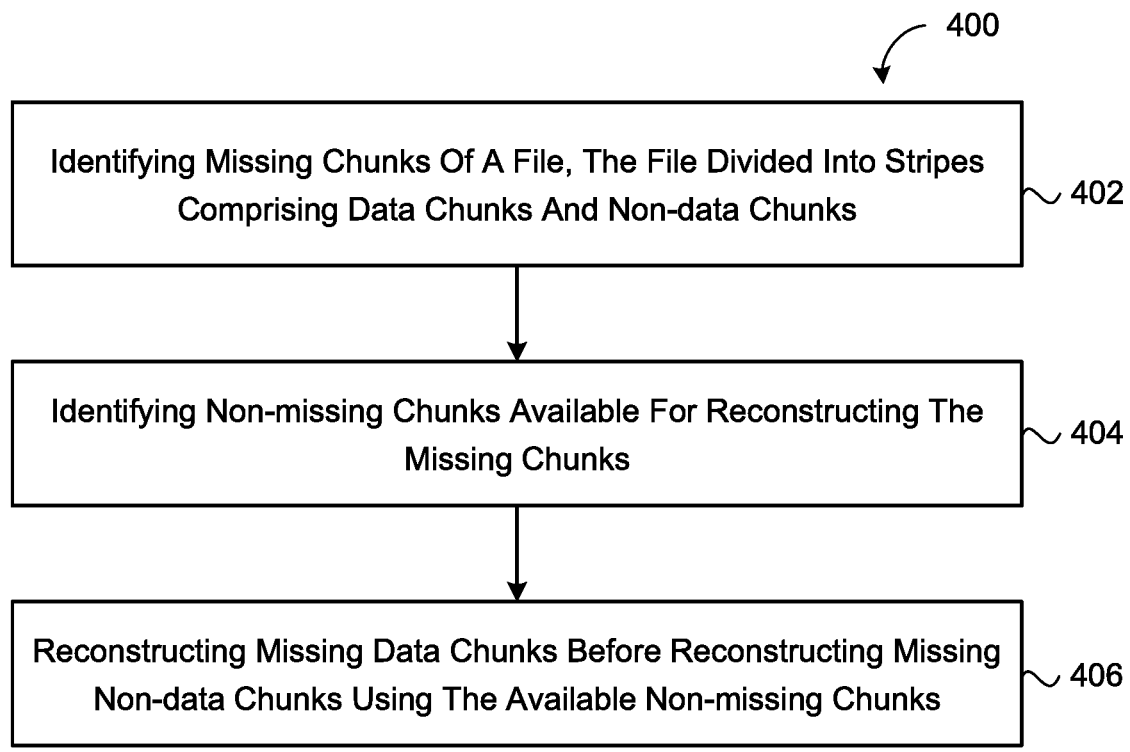
FIG. 4 is a schematic view of an exemplary arrangement of operations for reconstructing data in a stripe.

Referring to FIG. 4, in some implementations, a method 400 of operating a distributed storage system 100 includes identifying 402 missing chunks 330 of a file 310. The file 310 is divided into stripes 320 comprising data chunks 330nD and non-data chunks 330nC. The method 400 includes identifying 404 non-missing chunks 330 available for reconstructing the missing chunks 330 and reconstructing missing data chunks 330nD before reconstructing 406 missing non-data chunks 330nC using the available non-missing chunks 330.

In some implementations, the step of identifying 404 non-missing chunks 330 available for reconstructing the missing chunks 330 includes excluding non-missing chunks 330 located on storage devices non-operational for a threshold period of time.

The method 400 may include determining a number of chunks 330 to reconstruct per recovery cycle of the distributed storage system 100 as a minimum of the number of missing chunks 330 and a maximum number of chunks 330 allowed for reconstruction per recovery cycle and selecting missing data chunks 330nD preferentially over missing non-data chunks 330nC for reconstruction during each recovery cycle. The method 400 may include randomly selecting missing data chunks 330nD for reconstruction from the identified missing chunks 330. Additionally or alternatively, the method 400 may further include reconstructing missing chunks 330 in an order that maximizes stripe durability.

In some implementations, the non-data chunks 330nD include code-check chunks 330nCC, word-check chunks 330nWC, and code-check-word-check chunks 330nCCWC. In some examples, the method 400 includes reconstructing the missing code-check chunks 330nCC, after reconstructing the missing data chunks 330nD and before reconstructing the missing word-check chunks 330nWC and the missing code-check-word-check chunks 330nCCWC. In some examples, the method 400 further includes reconstructing the code-check chunks 330nCC, after reconstructing the missing data chunks 330nD and the missing word-check chunks 330nWC and before reconstructing the missing code-check-word-check chunks 330nCCWC, reconstructing the code-check chunks 330nCC.

The method 400 may include first reconstructing missing data chunks 330nD capable of being reconstructed from other data chunks 330nD and/or code-check chunks 330nCC only that are in the same column C. Then the method 400 may include reconstructing missing data chunks 330nD capable of being reconstructed from any chunks 330 of the encoded data block 314 (e.g., data chunks 330nD and/or code-check chunks 330nCC and/or word-check chunks 330nWC and/or code-check-word-check chunks 330nCCWC). For reconstructing missing data chunks 330nD capable of being reconstructed from other data chunks 330nD and/or code-check chunks 330nCC only, the method may include reconstructing multiple data chunks 330nD on a server during a recovery cycle and moving the reconstructed data chunks 330nD, except one data chunk 330nD, to other servers. In addition, reconstructing missing data chunks 330nD capable of being reconstructed from any chunks 330 of the encoded block 314 (e.g., data chunks 330nD and/or code-check chunks 330nCC and/or word-check chunks 330nWC and/or code-check-word-check chunks 330nCCWC) includes reconstructing multiple data chunks 330nD on a server during a recovery cycle and moving the reconstructed data chunks 330nD, except one data chunk 330nD, to other servers. The method 400 may further include identifying multiple chunks 330 associated with the same code-check chunk 330nCC for reconstruction during the recovery cycle.

The method 400 may include reconstructing missing word-check chunks 330nWC capable of being reconstructed from other word-check chunks 330nWC and/or code-checkword-check chunks 330nCCWC within the same column C and then reconstructing missing word-check chunks 330nWC capable of being reconstructed from any chunks 330 of the encoded block 314. The method 400 may also include reconstructing missing code-check-word-check chunks 330nCCWC after reconstructing all missing data chunks 330nD, code-check chunks 330nCC, and word-check chunks 330nWC. Reconstructing missing word-check chunks 330nWC capable of being reconstructed from other word-check chunks 330nWC and/or code-check-word-check chunks 330nCCWC and reconstructing missing word-check chunks 330nWC capable of being reconstructed from data chunks 330nD and/or code-check chunks 330nCC may each further include reconstructing multiple word-check chunks 330nWC on a server during a recovery cycle and moving the reconstructed word-check chunks 330nWC, except one word-check chunk 330nWC, to other servers.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating a distributed storage system, the method comprising:
   identifying, by data processing hardware, unhealthy chunks within a given stripe of a file, the file divided into stripes, each stripe comprising data chunks and non-data chunks formed by a nested coding process, the data chunks and non-data chunks arranged in an array of rows and columns, the non-data chunks comprising different types of check chunks that include at least one code-check chunk associated with each column in the array of rows and columns, word-check chunks associated with a row in the array of rows and columns, and code-check-word-check chunks associated with other check chunks, wherein an error-correcting functionality of each check chunk among the different types of check chunks of the non-data chunks is defined based on a location of the corresponding check chunk in a data structure of a corresponding stripe;
   for each unhealthy chunk, determining, by the data processing hardware, whether the unhealthy chunk is an unhealthy data chunk or an unhealthy non-data chunk;
   identifying, by the data processing hardware, healthy chunks comprising healthy data chunks and healthy non-data chunks available for reconstructing the unhealthy chunks; and
   reconstructing, by the data processing hardware, unhealthy data chunks before reconstructing unhealthy non-data chunks using the available healthy chunks,
   wherein when the unhealthy chunk is an unhealthy word-check chunk:
   reconstructing the unhealthy word-check chunk using healthy word-check chunks and healthy code-check-word-check chunks;
   determining, by the data processing hardware, whether reconstruction of the unhealthy word-check chunk is possible using only healthy word-check chunks and healthy code-check-word-check chunks; and
   when reconstruction of the unhealthy word-check chunk is not possible using only healthy word-check chunks and healthy code-check-word-check chunks, reconstructing, by the data processing hardware, the unhealthy word-check chunk using any healthy chunks.

2. The method of claim 1, further comprising, when the unhealthy chunk is an unhealthy data chunk, reconstructing the unhealthy data chunk using healthy data chunks and healthy code-check chunks.

3. The method of claim 2, further comprising reconstructing the unhealthy data chunk using healthy data chunks and healthy code-check chunks without using word-check chunks.

4. The method of claim 3, further comprising:
   determining, by the data processing hardware, whether reconstruction of the unhealthy data chunk is possible using only healthy data chunks and healthy code-check chunks; and
   when reconstruction of the unhealthy data chunk is not possible using only healthy data chunks and healthy code-check chunks, reconstructing, by the data processing hardware, the unhealthy data chunk using any healthy chunks.

5. The method of claim 1, further comprising, when the unhealthy chunk is an unhealthy code-check chunk, reconstructing the unhealthy code-check chunk using healthy data chunks and healthy code-check chunks.

6. The method of claim 5, further comprising:
determining, by the data processing hardware, whether reconstruction of the unhealthy code-check chunk is possible using only healthy data chunks and healthy code-check chunks; and
when reconstruction of the unhealthy code-check chunk is not possible using only healthy data chunks and healthy code-check chunks, reconstructing, by the data processing hardware, the unhealthy code-check chunk using any healthy chunks.

7. The method of claim 1, further comprising, when the unhealthy chunk is an unhealthy code-check-word-check chunk, reconstructing the unhealthy code-check-word-check chunk using healthy word-check chunks and healthy code-check chunks.

8. The method of claim 7, further comprising:
determining, by the data processing hardware, whether reconstruction of the unhealthy code-check-word-check chunk is possible using only healthy word-check chunks and healthy code-check chunks; and
when reconstruction of the unhealthy code-check-word-check chunk is not possible using only healthy word-check chunks and healthy code-check chunks, reconstructing, by the data processing hardware, the unhealthy code-check-word-check chunk using any healthy chunks.

9. A system for operating a distributed storage system, the system comprising:
storage devices non-transitorily storing chunks of a file, the file divided into stripes, each stripe comprising data chunks and non-data chunks formed by a nested coding process, the data chunks and the non-data chunks arranged in an array of rows and columns, the non-data chunks and comprising different types of check chunks that include at least one code-check chunk associated with each column in the array of rows and columns, word-check chunks associated with a row in the array of rows and columns, and code-check-word-check chunks associated with other check chunks, wherein an error-correcting functionality of each check chunk among the different types of check chunks of the non-data chunks is defined based on a location of the corresponding check chunk in a data structure of a corresponding stripe; and
a data processing device in communications with the storage devices, the data processing device configured to perform operations comprising:
identifying unhealthy chunks within a given stripe;
for each unhealthy chunk, determining whether the unhealthy chunk is an unhealthy data chunk or an unhealthy non-data chunk;
identifying healthy chunks comprising healthy data chunks and healthy non-data chunks available for reconstructing the unhealthy chunks; and
reconstructing unhealthy data chunks before reconstructing unhealthy non-data chunks using the available healthy chunks,
wherein when the unhealthy chunk is an unhealthy word-check chunk:
reconstructing the unhealthy word-check chunk using healthy word-check chunks and healthy code-check-word-check chunks;
determining whether reconstruction of the unhealthy word-check chunk is possible using only healthy word-check chunks and healthy code-check-word-check chunks; and
when reconstruction of the unhealthy word-check chunk is not possible using only healthy word-check chunks and healthy code-check-word-check chunks, reconstructing the unhealthy word-check chunk using any healthy chunks.

10. The system of claim 9, wherein the operations further comprise, when the unhealthy chunk is an unhealthy data chunk, reconstructing the unhealthy data chunk using healthy data chunks and healthy code-check chunks.

11. The system of claim 10, wherein the operations further comprise reconstructing the unhealthy data chunk using healthy data chunks and healthy code-check chunks without using word-check chunks.

12. The system of claim 11, wherein the operations further comprise:
determining whether reconstruction of the unhealthy data chunk is possible using only healthy data chunks and healthy code-check chunks; and
when reconstruction of the unhealthy data chunk is not possible using only healthy data chunks and healthy code-check chunks, reconstructing the unhealthy data chunk using any healthy chunks.

13. The system of claim 9, wherein the operations further comprise, when the unhealthy chunk is an unhealthy code-check chunk, reconstructing the unhealthy code-check chunk using healthy data chunks and healthy code-check chunks.

14. The system of claim 13, wherein the operations further comprise:
determining whether reconstruction of the unhealthy code-check chunk is possible using only healthy data chunks and healthy code-check chunks; and
when reconstruction of the unhealthy code-check chunk is not possible using only healthy data chunks and healthy code-check chunks, reconstructing the unhealthy code-check chunk using any healthy chunks.

15. The system of claim 9, wherein the operations further comprise, when the unhealthy chunk is an unhealthy code-check-word-check chunk, reconstructing the unhealthy code-check-word-check chunk using healthy word-check chunks and healthy code-check chunks.

16. The system of claim 15, wherein the operations further comprise:
determining whether reconstruction of the unhealthy code-check-word-check chunk is possible using only healthy word-check chunks and healthy code-check chunks; and
when reconstruction of the unhealthy code-check-word-check chunk is not possible using only healthy word-check chunks and healthy code-check chunks, reconstructing the unhealthy code-check-word-check chunk using any healthy chunks.

* * * * *